(12) United States Patent
Stockfisch

(10) Patent No.: US 7,016,887 B2
(45) Date of Patent: Mar. 21, 2006

(54) METHODS AND SYSTEMS OF CLASSIFYING MULTIPLE PROPERTIES SIMULTANEOUSLY USING A DECISION TREE

(75) Inventor: Thomas P. Stockfisch, Escondido, CA (US)

(73) Assignee: Accelrys Software Inc., San Diego, CA (US)

( * ) Notice: Subject to any disclaimer, the term of this patent is extended or adjusted under 35 U.S.C. 154(b) by 486 days.

(21) Appl. No.: 09/896,929

(22) Filed: Jun. 29, 2001

(65) Prior Publication Data

US 2002/0087499 A1    Jul. 4, 2002

Related U.S. Application Data

(60) Provisional application No. 60/259,622, filed on Jan. 3, 2001.

(51) Int. Cl.
    G06F 17/00    (2006.01)
    G06N 5/00    (2006.01)
(52) U.S. Cl. .............................. 706/45; 706/46; 706/14
(58) Field of Classification Search .................. 706/45, 706/46, 14; 707/205
    See application file for complete search history.

(56) References Cited

U.S. PATENT DOCUMENTS

| T998,008 | I4 | 9/1980 | DeLano, Jr. | |
|---|---|---|---|---|
| 4,719,571 | A | 1/1988 | Rissanen et al. | |
| 5,787,274 | A | 7/1998 | Agrawal et al. | |
| 5,799,311 | A | 8/1998 | Agrawal et al. | |
| 6,101,275 | A | 8/2000 | Coppersmith et al. | |
| 6,138,115 | A | 10/2000 | Agrawal et al. | |
| 6,182,058 | B1 | 1/2001 | Kohavi | |
| 6,230,151 | B1 * | 5/2001 | Agrawal et al. | ............... 706/12 |
| 6,247,016 | B1 * | 6/2001 | Rastogi et al. | ............... 707/101 |
| 6,269,353 | B1 * | 7/2001 | Sethi et al. | .................... 706/20 |
| 6,278,464 | B1 * | 8/2001 | Kohavi et al. | .............. 345/440 |
| 6,324,510 | B1 * | 11/2001 | Waibel et al. | .............. 704/256 |
| 6,563,952 | B1 * | 5/2003 | Srivastava et al. | .......... 382/225 |

OTHER PUBLICATIONS

Mati Wax, Construction of Tree Structured Classifiers by MDL Principle, Apr. 1990, IEEE, CH2847-2/90/0000-2157, 2157-2160.*

M. Kamber et al, Experiments in the Automated Detection of Multiple Sclerosis Brain Lesions in Magnetic Resonance Images, 1993, IEEE, 1043-0989/93, 457.*

(Continued)

*Primary Examiner*—Joseph P. Hirl
(74) *Attorney, Agent, or Firm*—Knobbe Martens Olson & Bear LLP

(57) ABSTRACT

This application describes systems and methods of forming a decision tree that simultaneously classifies multiple properties of items, and systems and methods of using the decision tree to simultaneously predicting multiple unknown properties of an item. In one embodiment, the decision tree has a top generic layer of nodes that are generic to all properties, a middle K layer of nodes that split on a property type descriptor K, and a bottom specific layer of nodes that are specific to some properties. In addition to simultaneously predicting multiple properties of new items, the decision tree may also aid users in uncovering relationships between properties and in determining what descriptors may represent a generic quality, and what descriptors may represent property-specific activity.

21 Claims, 17 Drawing Sheets

OTHER PUBLICATIONS

'PUBLIC: a decision tree classifier that integrates building and pruning.' Data Min. Knowl. Discov. (Netherlands), Data Mining and Knowledge Discovery, 2000, Kluwer Academic Publishers, Netherlands, ISSN 1384-5810, vol. 4, pp. 315-344.

'An interactive-graphic environment for automatic generation of decision trees.' Decis. Support Syst. (Netherlands), Decision Support Systems, Oct. 1996, Elsevier, Netherlands, ISSN 0167-9236, vol. 18, pp. 117-134.

Search Report for Application No. GB0130477.3 dated Aug. 19, 2002.

Page 18-92, Classification and regression trees, Breiman, Friedman, Olshen & Stone, Chapman & Hall / CRC 1984.

* cited by examiner

METHODS AND SYSTEMS OF CLASSIFYING MULTIPLE PROPERTIES SIMULTANEOUSLY USING A DECISION TREE

CROSS REFERENCE TO RELATED APPLICATIONS

This application claims priority under 35 U.S.C. §119(e) to U.S. Provisional Patent Application No 60/259,622, entitled Method and System for Classifying Compounds, and filed Jan. 3, 2001. The entire disclosure of this application is hereby incorporated by reference in its entirety.

BACKGROUND OF THE INVENTION

1. Field of the Invention

This invention relates to methods and systems of predicting properties of molecules.

2. Description of the Related Art

A physical item's unknown conditions can often be predicted based on the item's known conditions. Disease diagnosis is one simple example. If a patient has symptom A, and has symptom B, but does not have symptom C, then it may be predicted that the patient has some particular disease. In this example, the physical item's (the patient's) three known conditions (have symptom A, have symptom B, not have symptom C) are used to predict an unknown condition (that the patient has some particular disease). The conditions that are known or easy to measure or calculate are often called descriptors or X variables. The conditions that are unknown or difficult to measure or calculate, and that are believed to be related to the descriptors, are often called properties or Y variables.

Decision trees are one of the most common methods of forming predictions about a property of an item, based on descriptors of the item. The structure of a decision tree can be derived by studying existing items. Each of the existing items have known descriptor values and a known property value. The existing items that are used to formulate the decision tree are called training items. The items that have an unknown property and are not used in formulating the decision tree are called new items. The known descriptor values of the training items, in conjunction with the known property values of the training items, are used to develop a connected series of decision points in the form of the decision tree. The decision tree can then be used to predict the unknown property of a new item. For example, based on the descriptors (e.g., age and blood pressure) and the property (whether patient suffered a heart attack) of the training items (medical history data of prior patients), a decision tree can be formulated and then used to predict whether a new patient with given descriptors is likely to suffer a heart attack.

Decision trees classify training items by repeatedly splitting the training items into subsets at nodes of the tree. Each split is based on a logic test on one descriptor (e.g., whether the patient is more than fifty years old, whether blood pressure is greater than 100). Each terminal node (i.e., leaf) of the tree corresponds to a classification of the property. The property of a new item is then predicted by running the new item from the root of the tree through the logic tests of the decision tree, based on the descriptors of the new item, until a leaf is reached. The property corresponding to the leaf is the predicted property of the new data. In addition to predicting new property, the decision tree can also aid a user in interpreting relationships between descriptors and the property. For a more detailed description of decision tree methods, please refer to pp. 18–36 of the text of "Classification and Regression Trees", Breiman, Friedman, Olshen and Stone, Chapman & Hall/CRC 1984 (CART hereinafter). For a description of some of the advantages of a tree-structured approach, please refer to pp. 55–58, CART. The disclosure of the above described book "Classification and Regression Trees" is hereby incorporated by reference in its entirety.

Decision trees may include both classification trees and regression trees. A classification tree's terminal nodes each represent a class of properties. A regression tree's terminal nodes each represent a value of a property. As those ordinarily skilled in the art will appreciate, the disclosed methods and systems can be applied to both classification trees and regression trees. Therefore, the terms such as "class", "classify" and "classification," can be used in the present application to refer to assigning a class to a classification tree terminal node as well as assigning a value to a regression tree terminal node. The term "decision tree" as used in the application refers to both classification trees and regression trees.

FIG. 1 illustrates one example of a decision tree. The decision tree shows that for many compounds, poor absorption or permeation (the property value of NDL) are more likely when:

The total molecular weight (MWT) is over 500; or

The computed octanol/water partition coefficient (ALogP) is over 5; or

There are more than 5 H-bond donors in the molecule (HBD); or

There are more than 10 H-bond acceptors in the molecule (HBA).

This classification rule is also called the Lipinski rule, named after Lipinski, Lombardo, Dominy and Feeney. As shown in FIG. 1, the decision tree consists of a hierarchy of nodes. The top node 101 is called the root node. Nodes that flow downward from a node are called the descendents of that node. For example, 102 and 103 are descendents of 101, 104 and 105 are descendants of 102. Each node, except the nodes with no descendents, contains a logic test (also called a split) on one of the descriptors. For example, at 101, if descriptor MW has a value of no greater than 500, then 101 proceeds to its left descendent node 102. Otherwise 101 proceeds to its right descendent node 103. A logic test is represented by a circle in FIG. 1. The nodes with no descendents (103, 105, 107, 108 and 109) are called leaf nodes or terminal nodes. The values associated with leaf nodes are the predicted values of property (DL or NDL).

In one advantageous application, decision trees are developed and used to predict the likely biochemical and physiological properties of drug candidate compounds. In many cases, there are hundreds of molecules with known descriptors and a known property. In addition, the relationships between the descriptors and the property are typically not known, may be interrelated, may be highly non-linear, and may even differ for different members of the set of known compounds. It is often time-consuming and expensive to test the properties of a large number of drug candidcate molecules. Therefore it is often desirable to predict the properties of the new molecules, using decision tree(s) formed by classifying a training item set of molecules with known properties. Those new molecules with promising prediction results are then tested to experimentally determine their properties. For these situations, tree generation procedures have been developed which may be computer implemented, and which take as inputs the descriptors and properties of the known compounds and which produce as an output a predictive decision tree that can in some sense be considered the "best" tree in terms of generality and predictive value.

FIG. 2 illustrates a typical decision tree creation process. A start state block 202 proceeds to block 204. At block 204, the tree creation process chooses the root node of the tree as the node to split. At block 206, potential logic tests are rated at the node according to how much the logic tests can reduce the "impurity" of two groups of items which exit the node following a logic question directed to a descriptor. The impurity is reduced by a maximum value when a potential logic test at the node splits training items at the node into equal numbers of each property class. The impurity is reduced by a minimum value when the potential logic test at the node does not split training items at the node into more than one property classes. For a more formal definition of impurity, please refer to pp. 24–27, CART. At block 208, the logic test producing the largest drop in impurity is chosen and the tree is split at that node using the chosen logic test.

The splitting process is repeated until no split can reduce the impurity further or there is only one training item left at a node. At block 210, another node is chosen for evaluation of potential logic tests. At block 212, the chosen node is evaluated to determine if at least one potential logic test can reduce impurity at the node, and if the node represents only one training item. If the node represents more than one training item, and if a potential logic test can reduce impurity at the node, then the process proceeds to block 206, so that the node will be split with the logic test that best reduces impurity. If there is only one training item left at the node, or if no potential logic test can reduce impurity at the node, then the process proceeds from block 212 to block 214.

Thus, at block 214, a determination is made as to whether all nodes have been evaluated. If all nodes have been evaluated, then the tree creation process proceeds to end state block 216. If not all nodes have been evaluated, then another node that hasn't been evaluated is chosen for evaluation at block 210.

The tree created using the above-described process may not be optimal, because there is usually only one training item left at each leaf node. Such a large tree may perfectly classify the training items used to construct the tree, but such trees have been found to be inaccurate when applied to new items with unknown classification. To improve the applicability of the tree model to new items, a pruning process may be applied to reduce the size of the tree. Pruning reduces the number of nodes and thus reduces the number of logic tests. Compared to the original tree, the pruned tree can typically better predict the unknown properties of new items. However, a pruned tree may classify some training items incorrectly. Pruning more nodes may lead to more training items being classified incorrectly. For a more detailed description of the advantages and side effects of pruning, please refer to pp. 59–62, CART.

FIG. 3 illustrates examples of a tree, a branch, and a sub-tree. A branch of a tree includes the root node of the branch and its descendent nodes. In FIG. 3, tree 301 is the tree with a root node 301. Branch 302 is a branch of the tree 301, the branch starting at the branch root node 302. Pruning a branch from a tree is the process of deleting from the tree all descendents of the branch, i.e., cutting off all nodes of the branch except the root node of the branch. A sub-tree is the original tree minus the pruned branch. In FIG. 3, pruning away the branch 302 from the tree 301 results in the sub-tree 301–302.

A number of pruning approaches may be employed to prune a tree. One approach is called minimal cost-complexity pruning. The tree pruning process starts at a leaf node, prunes away branches until a sub-tree of the original tree is left. Since multiple sub-trees may be formed from a tree by a pruning process, minimal cost complexity pruning selects a sub-tree that minimizes the function $R_\alpha = R_0 + \alpha N_{leaf}$, where $R_0$ is the miscalculation cost on the training data set, $N_{leaf}$ is the number of leaf nodes, and $\alpha$ is a complexity parameter that controls the size of the tree. Therefore, $R_\alpha$ is a combination of the miscalculation cost of the tree and its complexity. In general, miscalculation cost is the cost or loss of mis-classifying an item as having one property value, when the item in fact has a different property value. For a formal definition of miscalculation cost, please refer to pp. 35–36 of CART. Using minimal cost complexity pruning, the pruning process successively cuts off branches until the function $R_\alpha = R_o + \alpha N_{leaf}$ stops decreasing. For a more detailed description of the pruning process, please refer to pp. 63–81 of CART.

Although the tree-based prediction of single properties is useful in many contexts, there are often multiple properties of interest associated with each item. For example, with respect to compounds A, B, and C, a molecule may have properties (binds with A), (does not bind with B), and (binds with C). As another common example, a molecule may bind to a target of interest, and may thus be a good pharmaceutical candidate, but may have other properties such as toxicity or poor bioabsorption that are also relevant to the usefulness of the compound as a drug.

A training item set may thus include a number of molecules each with its own descriptors (such as molecule size, surface area, number of rotable bonds, system energies, and so forth) and its multiple properties. According to traditional decision tree methods, in order to predict multiple properties, the training item set is split into multiple subsets, each containing the descriptors of the training items and one of the properties. For each of the subsets, a computing process is run to classify each of the subsets. A separate decision tree is then formed for each of the properties. Using each of the decision trees, each of the corresponding properties of a new item is then predicted. In addition to requiring multiple tree-creating and predicting processes, these traditional methods also produce too much complexity for researchers. Since each of the decision trees created using these traditional methods concern only one property, they inhibit researchers from discovering "generic" descriptors and logic tests on such descriptors that are relevant to all properties. They also inhibit researchers from analyzing the relationships between descriptors, for example, the relationships between more generic descriptors and less generic descriptors. The multiple trees created by traditional methods inhibit researchers from finding descriptors and logic tests on such descriptors that are relevant to all properties or several of the properties.

SUMMARY OF THE INVENTION

This application describes systems and methods of forming a decision tree that simultaneously classifies multiple properties of items. In one embodiment of the invention, training items having multiple X descriptors and multiple known properties are converted into multiple converted items of the same multiple X descriptors, an additional property type descriptor (called the K descriptor), and one property. Each converted item has a K descriptor of a different value and a different property. A pure specific decision tree is created based on a set of converted items, by first splitting the root node by a logic test on descriptor K and splitting subsequent nodes by logic tests on X descriptors. The created tree is saved as an alternate K-branch of a maximally generic tree. The maximally generic tree is created by first splitting the root node on an X descriptor and splitting its immediate descendent nodes on the K descriptor. K nodes are saved as alternate K-branches and restored to the tree if no generic split can reduce the impurity at the node for all properties. The created maximally generic tree is permuted to produce the final decision tree. The final decision tree produced with this method has a top generic layer of nodes that are generic to all properties, a middle K layer of nodes that split on descriptor K, and a bottom specific layer of nodes that are specific to some properties. To predict multiple unknown properties of a new item, the new item's X descriptors are evaluated against the final decision tree. The evaluation forms multiple sub-paths in the decision tree, each corresponding to a different K value. The multiple sub-paths each reach a terminal node. The values represented by the terminal nodes are the predicted values of each property of the new item.

DETAILED DESCRIPTION OF THE PREFERRED EMBODIMENT

Embodiments of the invention will now be described with reference to the accompanying Figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

Figure 4:
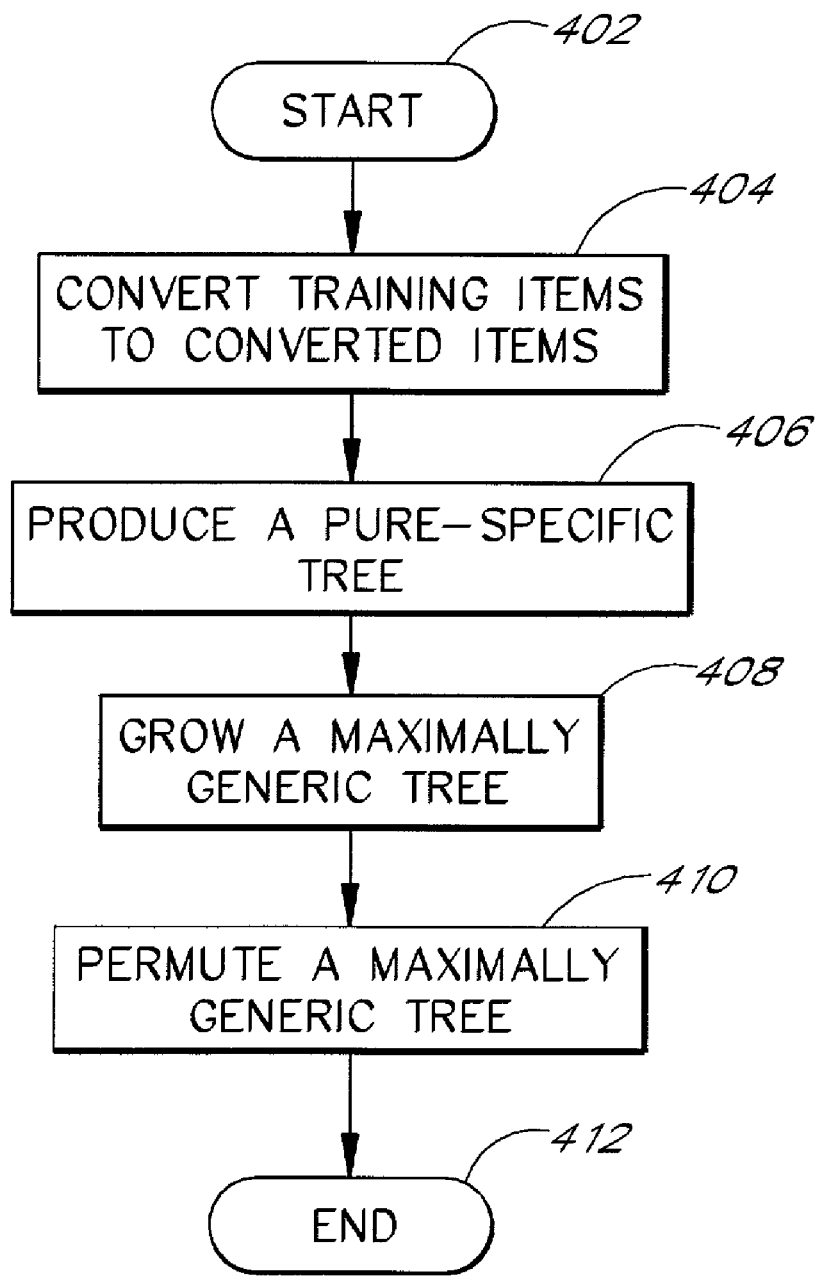
FIG. 4 illustrates one embodiment of the general process of forming a decision tree to classify training items with multiple properties.

As described above in the background section, training items and new items often have multiple properties. FIG. 4 illustrates one embodiment of the general process of forming a decision tree to classify training items with multiple properties. A start state block 402 proceeds to block 404. At block 404, the general process converts multiple-property training items into converted items of single property and an additional K descriptor. One specific example of a suitable converting process will be described in the following section titled "Converting to Single-Property Items." The general process then proceeds to block 406. At block 406, the converted items are used by the process to produce (i.e., to grow and to optionally prune) a pure-specific tree that splits the converted items by a logic test on the K descriptor at the root node. One specific example of a suitable process for producing a pure-specific tree is described in the section below titled "Producing a Pure-Specific Tree".

The general process then proceeds to block 408. At block 408, the produced pure-specific tree is used as a basis for growing a maximally generic tree, whose root node is split by a X descriptor. One specific advantageous embodiment of a process for growing the maximally generic tree is described in the following section titled "Growing a Maximally Generic Tree." The general process then proceeds to block 410. At block 410, the maximally generic tree is permuted to form a final decision tree. One example of an advantageous process for permuting is described in the section below titled "Permuting the Maximally Generic Tree." The produced final decision tree classifies the converted items by the logic tests at the nodes. The general process then proceeds to an end state block 412.

Converting to Single-Property Items

Figure 5:
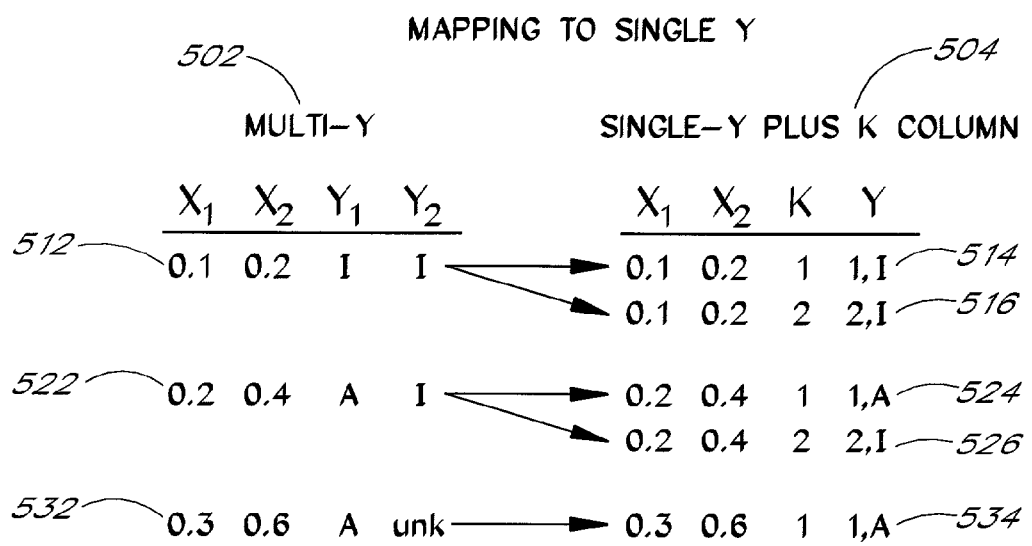
FIG. 5 illustrates one embodiment of converting training items with multiple properties into training items with a single property and an additional K descriptor.

FIG. 5 illustrates one embodiment of converting training items with multiple properties into converted items with a single property and an additional K descriptor. The example item set 502 has three training items 512, 522 and 532, each with two X descriptors (X1 and X2) and two properties (Y1 and Y2). In an advantageous application, each training item represents a molecule. The two properties have possible values A (Active) or I (Inactive). As the arrows indicate in FIG. 5, the conversion process converts each training item in the left column into one or two converted items in the right column. Training item 512 is converted to two converted items 514 and 516. The X1 and X2 descriptors of 512 are copied to the X1 and X2 descriptors of 514 and 516. A K descriptor with value "1" is added to 514 as an additional descriptor. A K descriptor with value "2" is added to 516 as an additional descriptor. The Y1 value of 512 is copied to the Y value of 514. The Y2 value of 512 is copied to the Y value of 516. Training item 522 is converted to two converted items 524 and 526 using the same process.

In FIG. 5, the Y value is displayed as a pair of a K value and the corresponding Y1 or Y2 value. For example, the Y value of converted item 524 is displayed as (1,A), with 1 representing converted item 524's K value and "A" representing the Y1 value of training item 522. The Y value of converted item 526 is displayed as (2,I), with 2 representing converted item 526's K value and "I" representing the Y2 value of training item 522.

If a training item has a property with unknown value, then that property value is not copied to a converted item. For example, since training item 532 only has one property Y1 with a known value, training item 532 is only converted to one converted item 534. After conversion, the converted item set 504 has converted items 514, 516, 524, 526 and 534, each with three descriptors (X1, X2 and K) and one property Y.

As a more formal description of the conversion process, a training item set contains multiple items each with X descriptor values $(X_1, X_2, \ldots X_d)$ and property values $(Y_1, Y_2, \ldots Y_p)$. The conversion process converts each original item into P converted items, P being the number of properties having known value for the original item. Each converted item has descriptor values $(X_1, X_2, \ldots X_d, K)$ and one property value Y. The P converted items have respective K value and Y value of: K=1, Y=(1, $Y_1$); K=2, Y=(2, $Y_2$); ... K=P, Y=(P, $Y_p$). If the value of $Y_j$ (j being a value between 1 and P) of the original item is unknown, then the conversion process omits the converted item of $Y=Y_j$.

Producing a Pure-Specific Tree

Figure 1:
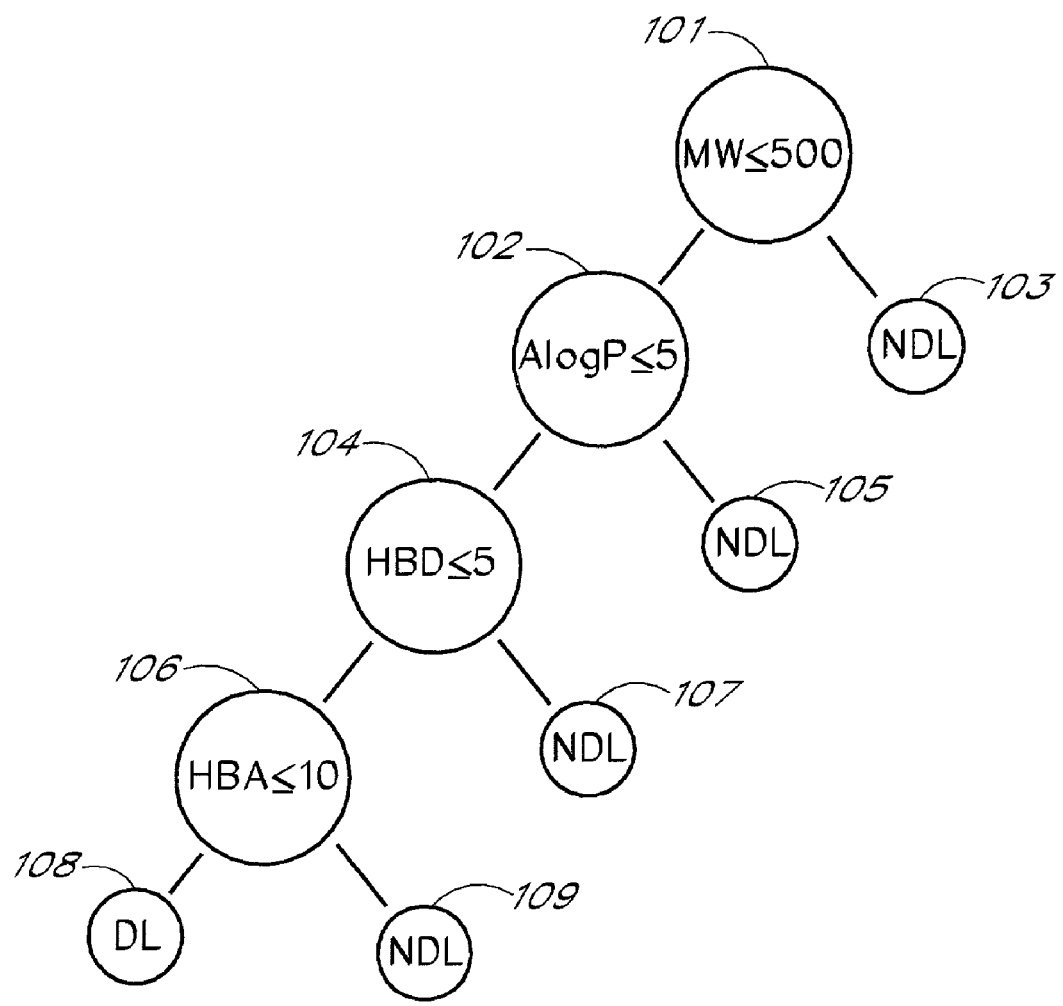
FIG. 1 illustrates one example of a decision tree.
Figure 2:
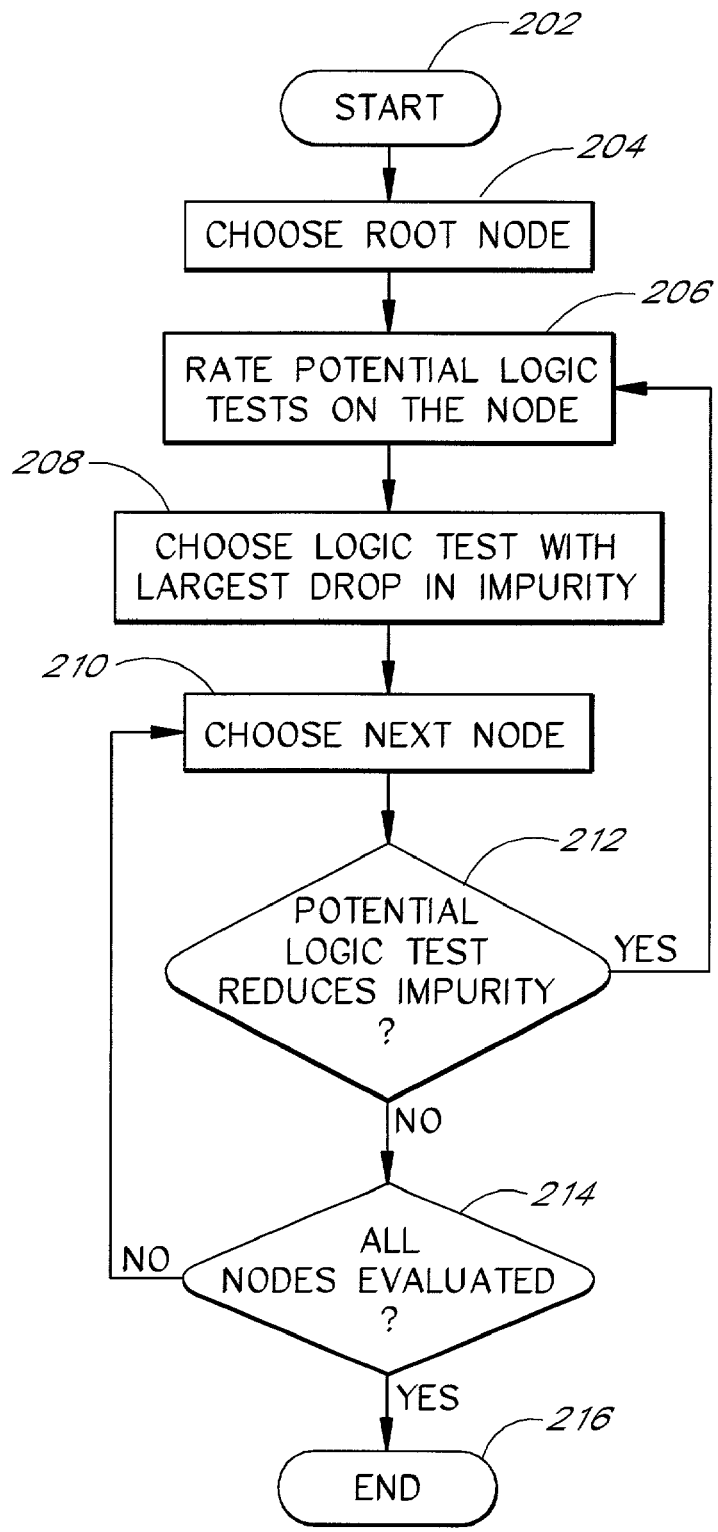
FIG. 2 illustrates a typical decision tree creation process.

The converted item set as illustrated in FIG. 5 is now ready for use in producing a pure specific tree. The process starts by performing a split on descriptor K (called a K-split) at the root node of an original tree. The process then splits subsequent nodes on X descriptors. Using the tree creation process illustrated in FIG. 2, an original tree is formed. The original tree is then pruned.

In one embodiment, the above-described minimal cost-complexity pruning (minimizing the function $R_\alpha = R_o + \alpha N_{leaf}$) is used to prune the tree. In one implementation, a user is invited to adjust the value of $\alpha$. In another implementation described in pp. 75–77 of CART, a cross-validation method is used to find the best value of $\alpha$. For a more formal discussion of optimally pruned sub-trees, please refer to pp. 284–293, CART.

In another embodiment, the original tree is created using Bonferoni-modified t-test statistic splitting and not pruned. This algorithm is known to those in the art, and one implementation of Bonferoni-modified t-test statistic splitting is included in a commercially available software application named FIRM from Molecular Simulations, Inc. in San Diego, Calif. The resulting tree is referred to herein as a pure specific tree. It is called pure specific because the root node splits on K, therefore the nodes below the root are specific to some of the properties (Y1, Y2, ... Yp), and none of the nodes that split on X is generic to all properties.

Figure 6:
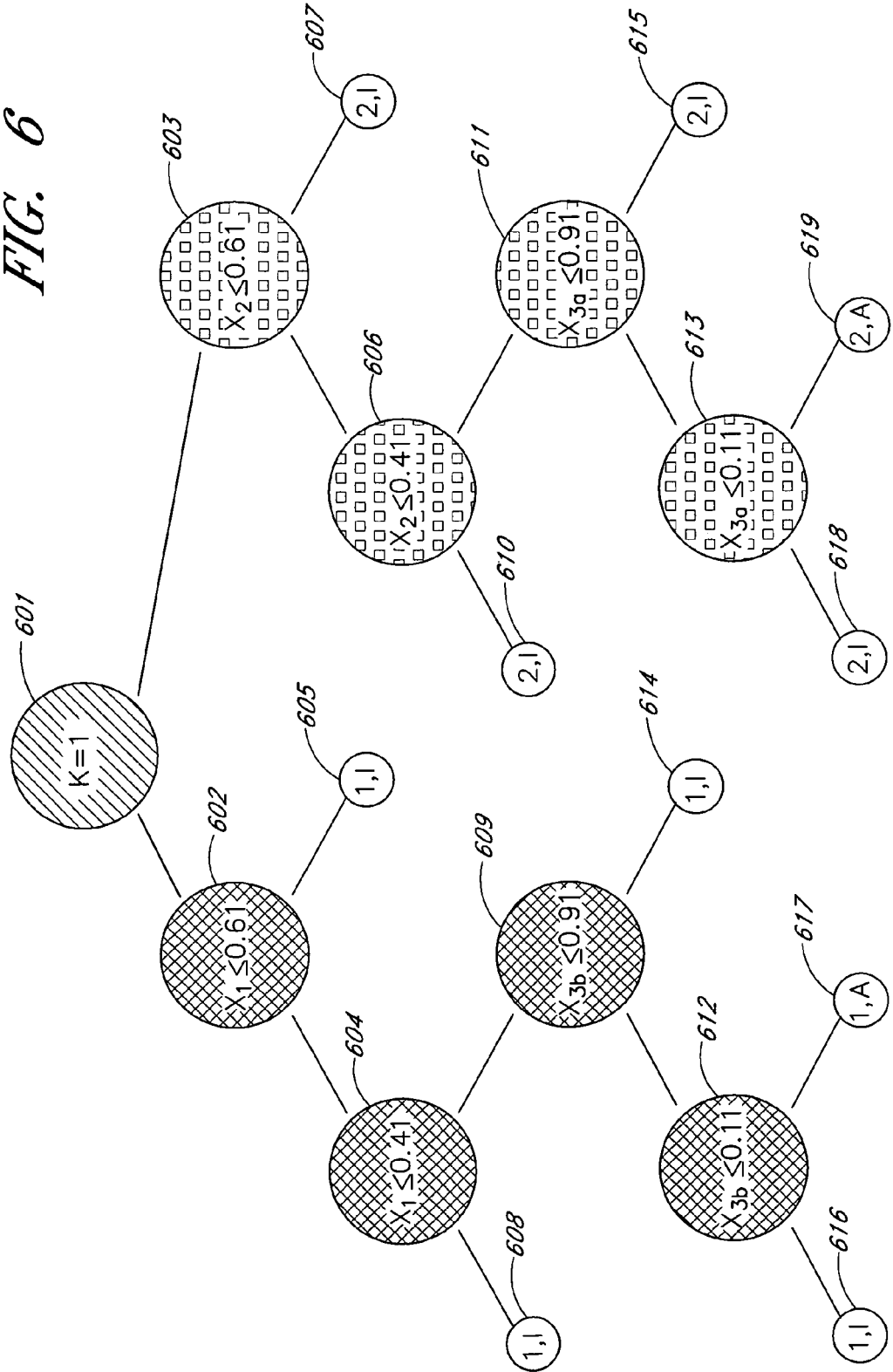
FIG. 6 illustrates an example of a pure specific tree.

FIG. 6 illustrates an example of a pure specific tree where P=2. The tree includes the K-split root node 601, a Y1 portion having nodes 602, 604, 605, 608, 609, 612, 614, 616 and 617, and a Y2 portion having nodes 603, 606, 607, 610, 611, 613, 615, 618 and 619. Each terminal node is marked with its property type followed by its property value. For example, terminal node 605 is marked with "1, I", which represents a value of "Inactive" for the first property type Y1. Terminal node 619 is marked with "2, A", which represents a value of "Active" for the second property type Y2. It may be noted that this process has produced two separate trees, one for each property. The two trees are joined at a root node which splits the item based on the K descriptor, which is simply an index for each property of interest.

Advantages of a More Generic Tree

Although the above-described pure specific tree classifies multiple properties simultaneously, it is often more desirable to form a tree whose root node is split on a X descriptor (a generic split). This is because a generic split at the root would better utilize training items. For example, a training item set may consist of 1000 training items with known property Y1 and 20 training items with known property Y2. A generic split at the root uses the 1020 training items to split. If the root node is split by K, then a subsequent generic split by Y2 would only use the 20 training items with known property Y2. As those ordinarily skilled in the art would appreciate, a split using more training items is typically preferred over a split using fewer training items. Therefore a generic split at the root is preferred because the split uses all training items.

Figure 7:
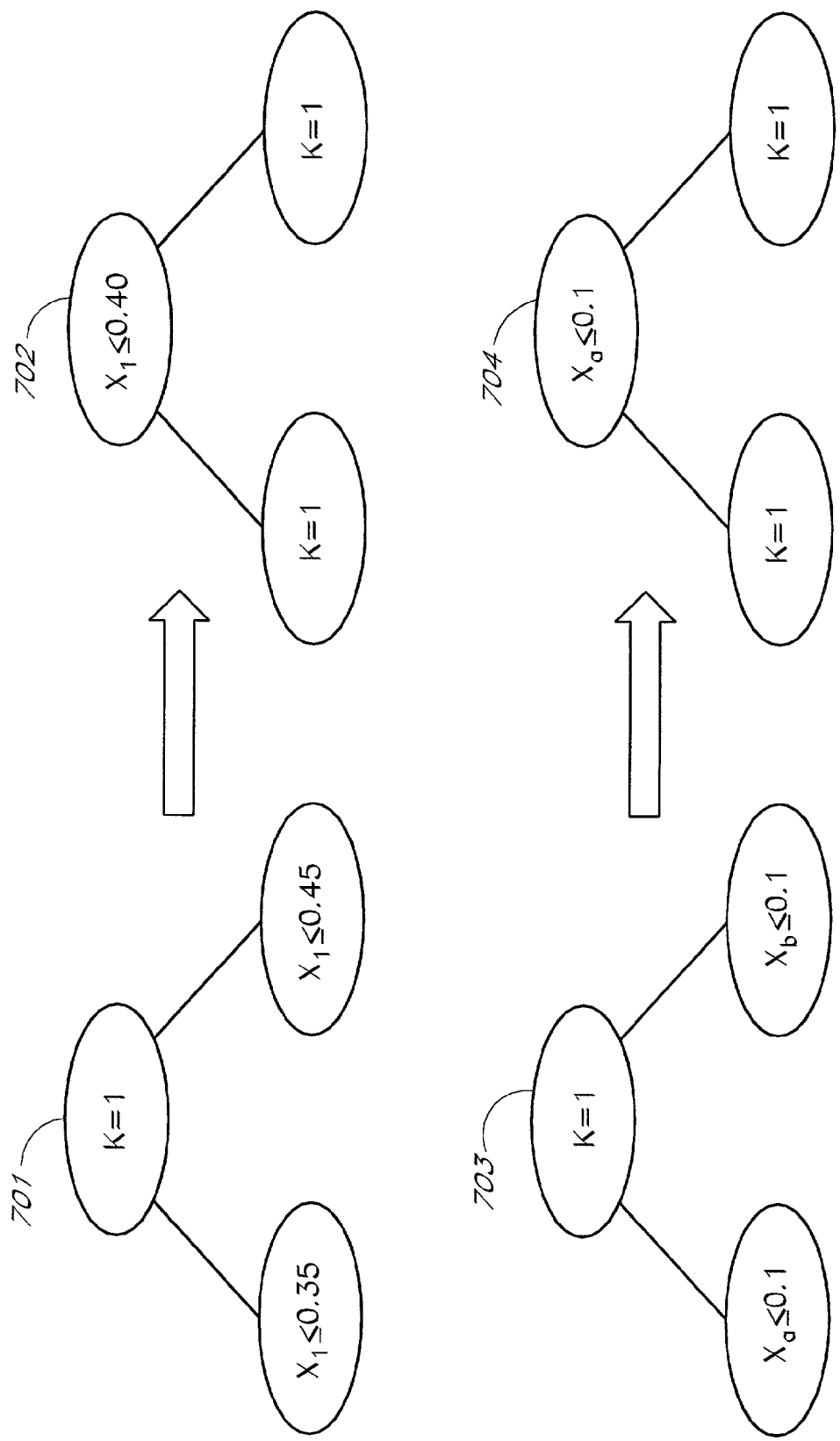
FIG. 7 illustrates some advantages of a more generic tree.

A more generic tree may have additional advantages, as illustrated in FIG. 7. A generic split at the root is preferred because it results in a smaller number of split values on any given X descriptor. As FIG. 7 illustrates, a more generic tree 702 is preferred over a less generic tree 701, because only one split value (X1≦0.40) is used in tree 702. Tree 701 is not preferred because two split values (X1≦0.35, X1≦0.45) are used in tree 701. Moreover, a generic split at the root results in fewer X descriptors used for splitting. As FIG. 7 further illustrates, a more generic tree 704 is preferred over a less generic tree 703, because tree 704 uses only one X descriptor (Xa), but tree 703 uses two X descriptors (Xa and Xb). A decision tree with fewer split values on X descriptors and/or uses fewer X descriptors may be preferred, because it is a simpler model, is more likely to be widely applicable, and will typically be easier to interpret.

Growing a Maximally Generic Tree

Figure 8:
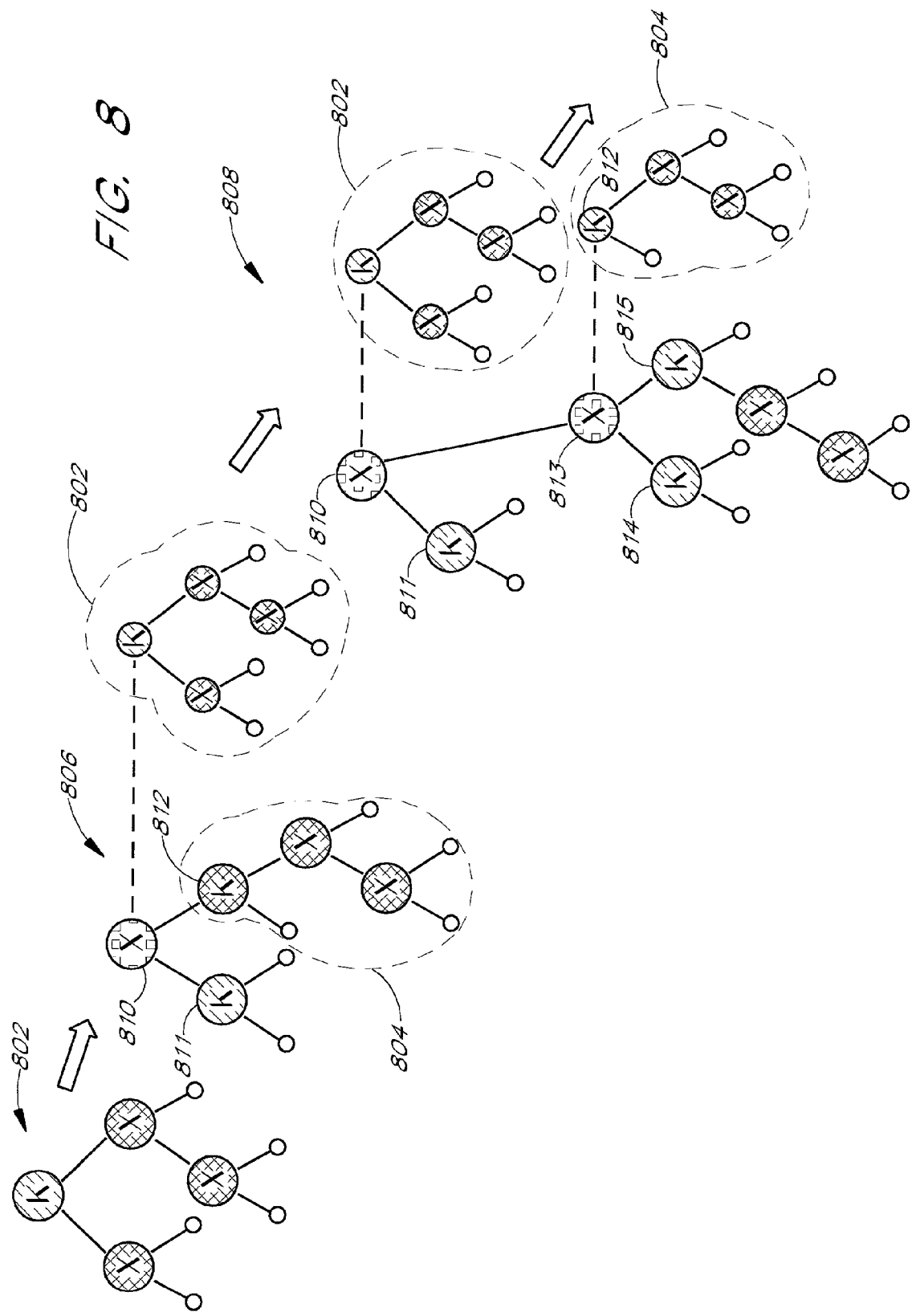
FIG. 8 illustrates an example of a tree being re-grown successively.

In order to create a tree more generic than the pure specific tree, the pure specific tree is used as a basis from which a larger tree is re-grown. FIG. 8 illustrates an example of a tree being re-grown successively. Tree 802, which is the pure-specific tree produced in the above described process, is re-grown into tree 806, which is then re-grown into tree 808. The pure specific tree 802 is saved as an alternate K-branch of tree 806. The re-growing process splits the root node using an X descriptor. The re-growing process evaluates potential X splits on the root node using the formula $\min_j \Delta I_j$, where $\Delta I_j$ is the drop in impurity for the classes of $Y_j$ resulting from the potential split. For all properties ($Y_1, Y_2, \ldots Y_p$), $\min_j \Delta I_j$ is the drop in impurity for the property $Y_j$ that has the smallest drop of impurity. The potential split with the largest $\min_j \Delta I_j$ is chosen. By using this "mini-max"/"maxi-min" style formula, the re-growing process chooses a split that reduces impurity for all properties.

Figure 3:
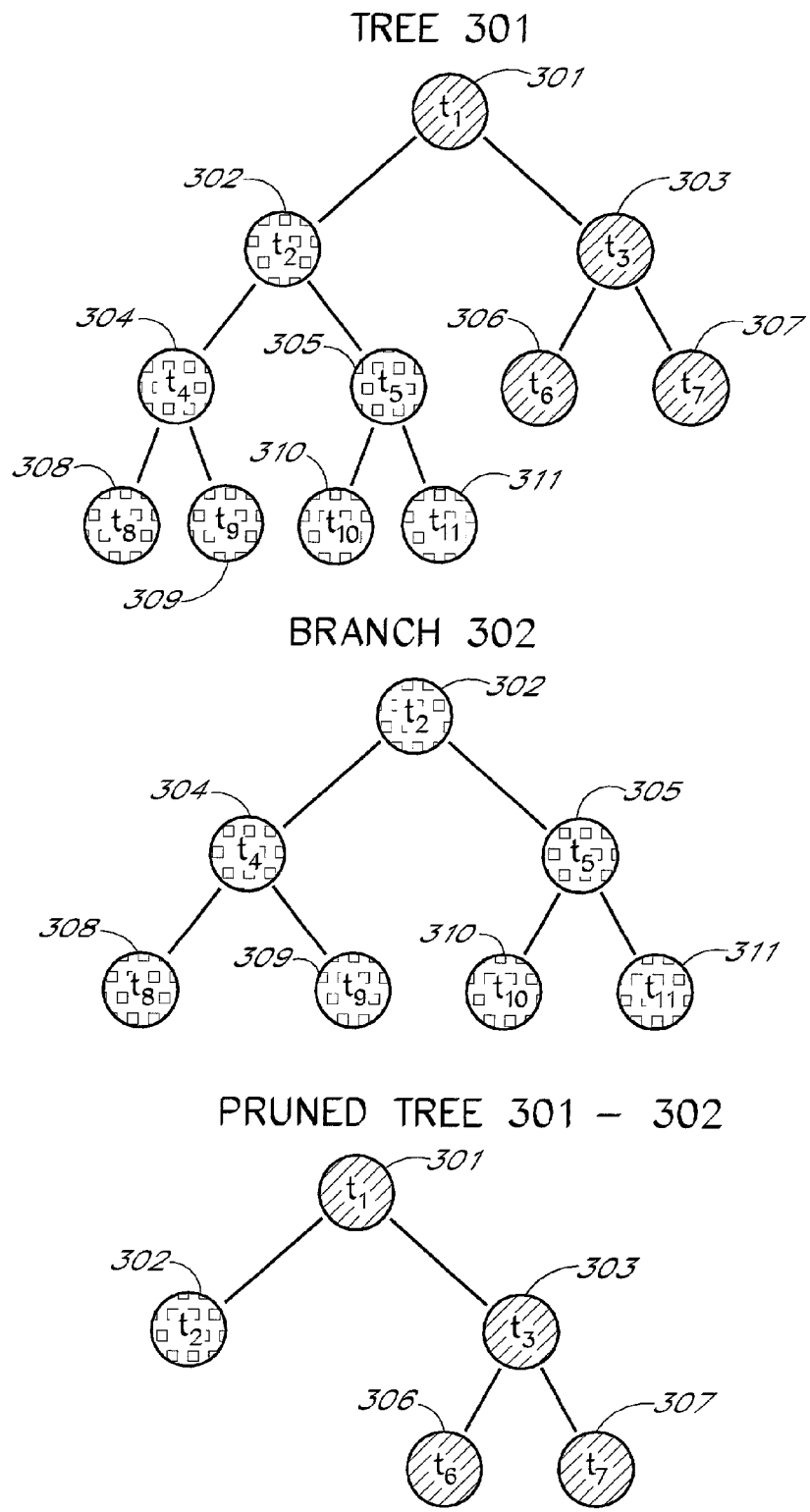
FIG. 3 illustrates examples of a tree, a branch, and a sub-tree.

After the root node is split using an X descriptor logic test selected in the above described way, the immediate descendent nodes of the root node are then split using descriptor K. The descendent branches from these K-nodes are then produced and pruned using the processes described in the background section in connection with FIG. 2 and FIG. 3.

The above-described process is repeated. For example, referring to tree 806 of FIG. 8, after respective K-splits are applied to immediate descendent nodes 811 and 812 of root node 810, branch 804 is saved as an alternate K-branch. As will be described in connection with FIG. 9, an alternate K-branch may be restored to the tree. For example, referring to tree 806 of FIG. 8, if the process finds that there are no appropriate generic split on node 812, then the process restores branch 802 by replacing node 810 and its descendents with node 802 and its descendents. Now referring to tree 808, a generic split is applied to the new node 813, and node 813's immediate descendents 814 and 815 are split on K. The process repeats until there is no split considered in place of the K-split that can cause a drop in impurity for every $Y_j$ (i.e., $\min_j \Delta I_j$ is less than or equal to zero). In one embodiment, the process also stops if no split below a K-split survives pruning, to keep statistically unimportant splits from appearing. The re-growing process is further described in connection with FIG. 9.

Figure 9:
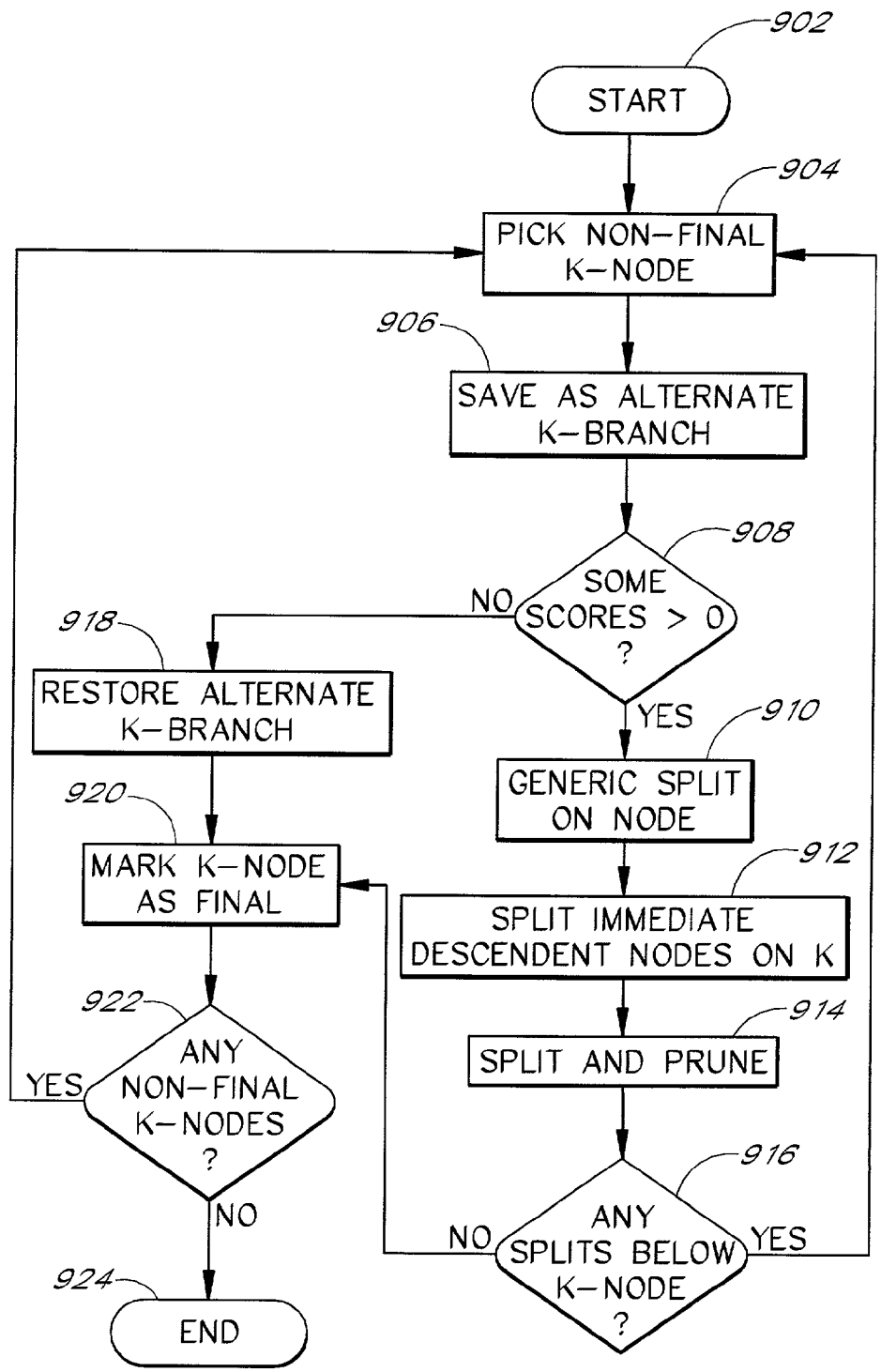
FIG. 9 illustrates one embodiment of the re-growing process.

FIG. 9 illustrates one embodiment of the re-growing process. A start block 902 proceeds to block 904. At block 904, the re-growing process picks a non-final K-node. A final K-node is a node that cannot be turned into an alternate K-branch and replaced by a X branch, a non-final K-node is a node that can be turned into an alternate K-branch and replaced by a X branch. At the start of the re-growing process, the root node of the pure specific tree is marked and picked as a non-final K-node. The picked non-final K-node and its descendents form a K-branch. At block 906 the process saves the K-branch as an alternate K-branch. At block 908, The process calculates a score for each prospective X split based on the minimum drop in impurity for each Y variable considered separately. In other words, using $\min_j \Delta I_j$ as the score to guarantee that a split appropriate for all properties is chosen. If no prospective X split can reduce impurity for all Y variables, then the process proceeds to block 918 to restore the K-branch saved at block 906 to the tree.

Sill referring to block 908 of FIG. 9, if the score is greater than 0 for a prospective X split then the prospective X split is a split appropriate for all properties. The process then proceeds to block 910 and selects the prospective X split that has the largest $\min_j \Delta I_j$ as the split on the node. The process then proceeds to block 912 and splits the immediate descendent nodes of the K-node by logic tests on the K descriptor. At block 914 the process further splits the subsequent branches and prunes the branches, using the splitting and pruning processes described above in the background section. At block 916 a determination is made as to whether one of the K-nodes created at block 912 can be split any further, i.e., whether the K-node is a non-final K-node. The answer is yes if (1) a generic split on a node below the K-node has a drop in impurity for all properties, and (2) the split survives pruning. If the K-node cannot be split any further, then the process proceeds to block 920. Otherwise the K-node is marked and picked as a non-final K-node and the process returns to block 904.

At block 908, if no prospective X split has $\min_j \Delta I_j > 0$, i.e., no prospective split is appropriate for all properties, then the process proceeds to block 918 and restores the alternate K-branch to the tree. At block 920, the K-node is marked as final. At block 922 a determination is made as to whether there are any non-final K-nodes. If the answer is yes, then the process returns to block 904. If the answer is no, then the process proceeds to an end state block 924.

In some applications of the above-described process, there are no prospective X split of $\min_j \Delta I_j > 0$, i.e., no prospective X split that reduces impurity for all properties, for nodes below the X-split root node. In these applications, the generic root node is followed by K-split nodes and terminal nodes, it is the only node that splits by a X descriptor in the produced maximally generic tree.

In one embodiment, the process enforces a strict binary tree model. A K-split splits into two branches, even if there are more than two properties. For example, if the training item set contains items of three properties, and the K-split logic test on a node is "Is K=1?", then a left branch represents data of K=1, and a right branch represents data of K=2 and K=3. The right branch may be further split by a logic test "Is K=2?". In another embodiment, a K-split contains one or more logic tests in order to split the node into multiple branches, with each branch representing a K value. Using the same example, a K-split on the node would include logic tests such as "Is K=1?" and "If not, Is K=2?", in order to split the node into 3 branches. Those ordinarily skilled in the art would appreciate that a non-binary split may be represented as a sequence of binary splits. In yet another embodiment, a X-split may also contain one or more logic tests in order to split the node into two or more branches.

Permuting the Maximally Generic Tree

Figure 10:
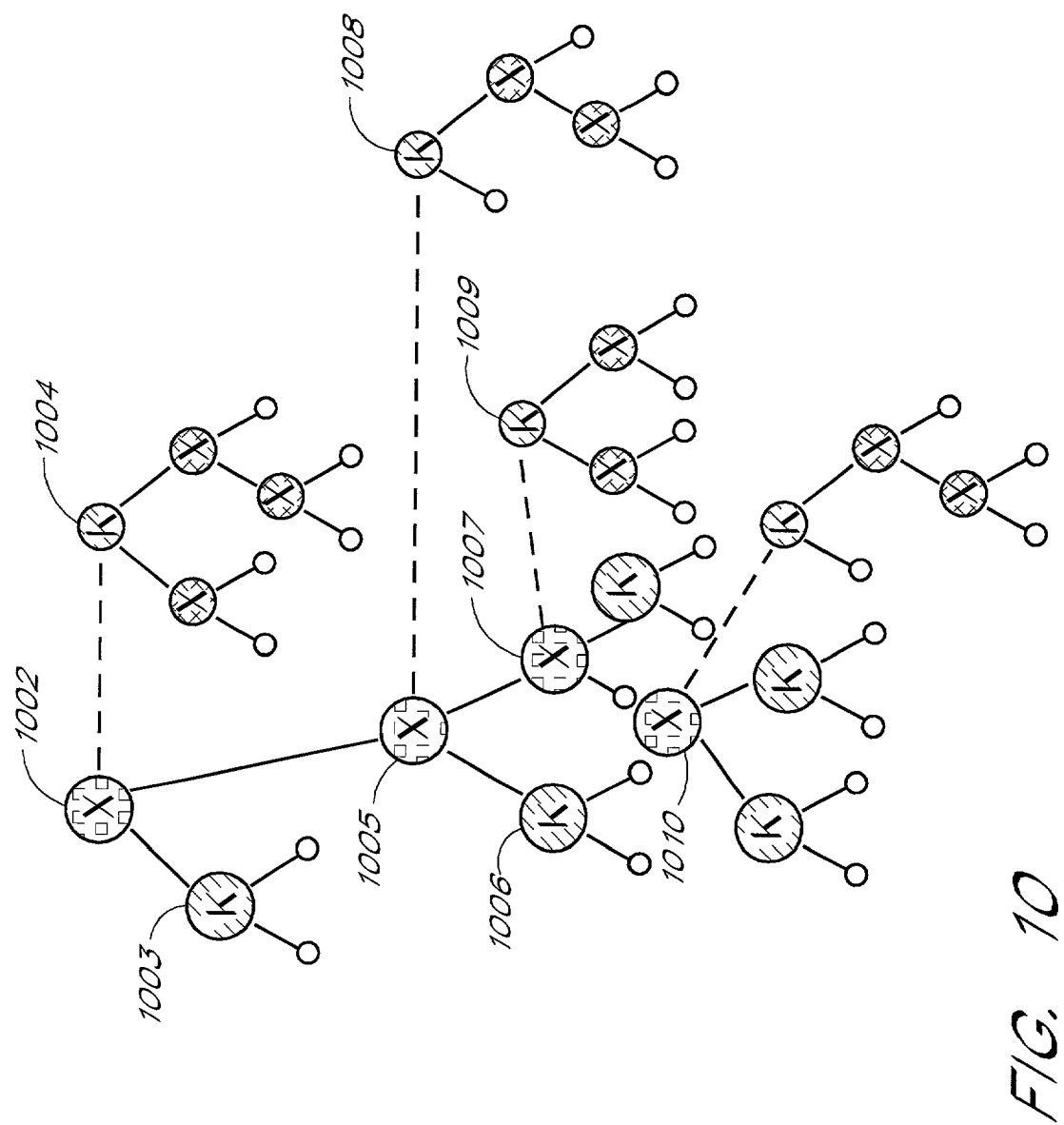
FIG. 10 illustrates one example of a maximally generic tree.

The above-described process has produced the maximally generic tree. FIG. 10 illustrates one example of a maximally generic tree. The maximally generic tree is then permuted to form a final decision tree illustrated in FIG. 11. Different sub-trees can be constructed from the maximally generic tree by following the main generic branches or the alternate K-branches at each generic node. In one advantageous embodiment, the sub-tree that minimizes the function $R_{\alpha\beta} = R_o + \alpha(N_{leaf} - \beta N_{generic})$ is selected. This function is an augmented minimal cost-complexity formula, where $R_o$ is the miscalculation cost on the training data set, $N_{leaf}$ is the number of leaf nodes, $\alpha$ is a complexity parameter, $N_{generic}$ is the number of generic nodes, and $\beta$ is a parameter governing the number of generic nodes in the tree. Using a predetermined value of $\beta$, and a modified version of the minimal cost-complexity pruning process described above in the background section, the sub-tree that minimizes the function $R_{\alpha\beta} = R_o + \alpha(N_{leaf} - \beta N_{generic})$ is selected.

The value of $\alpha$ in the function $R_{\alpha\beta} = R_o + \alpha(N_{leaf} - \beta N_{generic})$, which is also referred to as $\alpha'$ in the text of this and the following paragraph, can be found by a cross-validation method. For example, in the re-growing process described in connection with FIG. 9, a function $R_{\alpha'} = R_o + \alpha' N_{leaf}$ can be used in the pruning process of block 914. The cross-validation method can be used to find a value of $\alpha'$.

The value of $\alpha'$ can also be determined based on the value of $\alpha$ in the function $R_\alpha = R_o + \alpha N_{leaf}$. In one embodiment, $\alpha'$ is identified as equal to the value of $\alpha$ in the function $R_\alpha = R_o + \alpha N_{leaf}$ used for pruning the pure-specific tree. In another embodiment, $\alpha$ is identified as a value smaller than the value of $\alpha$. As described above in the section titled "Advantages of a More Generic Tree", a more generic tree utilizes more training items for X splits. Therefore, while a larger $\alpha$ value (resulting in fewer leaf nodes) may be desirable for a pure-specific tree, a smaller $\alpha'$ value (resulting in more leaf nodes) may be desirable for a more generic tree. As described above, the value of $\alpha$ in the function $R_\alpha = R_o + \alpha N_{leaf}$ can be determined by a cross-validation method or by user determination in the pruning process of the pure-specific tree.

As illustrated in FIG. 10, the permuting process starts at the root and compares the generic main branch with the alternate K-branch, choosing the branch with the smaller $R_{\alpha\beta}$. For example, starting from root node 1002 of FIG. 10, the permuting process compares the generic main branch that starts at node 1002, which is the sum of branch 1003 and branch 1005, with the alternate K-branch that starts at node 1004, choosing the branch with the smaller $R_{\alpha\beta}$. If the generic main branch starting at node 1002 is chosen over the K-branch, then the permuting process compares the generic main branch that starts at node 1005, which is the sum of branch 1006 and branch 1007, with the alternate K-branch that starts at node 1008, choosing the branch with the smaller $R_{\alpha\beta}$. The resulting final decision tree includes generic nodes at and near the root and specific nodes near the leaves. As described in the previous section titled "Advantages of a More Generic Tree," a more generic decision tree is typically preferred.

Figure 11:
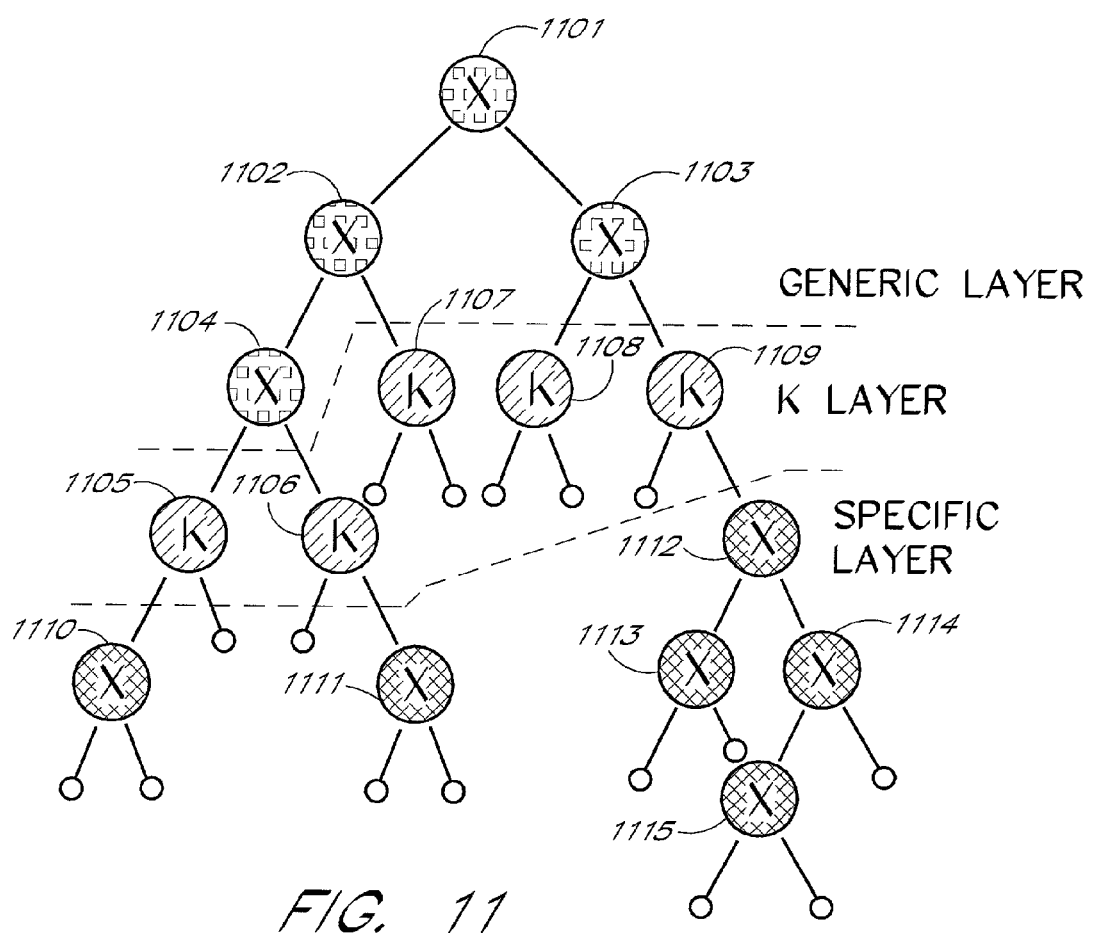
FIG. 11 illustrates one example of a final decision tree.

FIG. 11 illustrates one example of a final decision tree, as a result of permuting a maximally generic tree. The K-nodes 1105–1109 are nodes split by the descriptor K. Generic nodes 1101, 1102 and 1103 are nodes split by a X descriptor and not having a K-node ancestor. Specific nodes 1110–1115 are nodes split by a X descriptor and having a K-node ancestor. The terminal nodes (not labeled) represent property classifications. Compared to the pure-specific tree of FIG. 6, the tree of FIG. 11 is more generic, that is to say, has more X descriptor nodes at or near the root node that applies to all properties.

Finding All Distinct Optimal Trees

The previous section describes permuting the maximally generic tree to form a final decision tree, using a predetermined $\beta$ parameter. In one embodiment, a user is invited to determine a value for $\beta$. The permuting process described in the previous section then produces an optimal sub-tree based on the value of the $\beta$. This section describes finding values of $\beta$ that produce distinct optimal sub-trees of the maximally generic tree. Although $\beta$ may have an infinite number of possible values, only a limited number of distinct optimal sub-trees may be produced using the formula $R_{\alpha\beta}=R_o+\alpha(N_{leaf}-\beta N_{generic})$ and the pruning process described in the previous section.

Figure 12A:
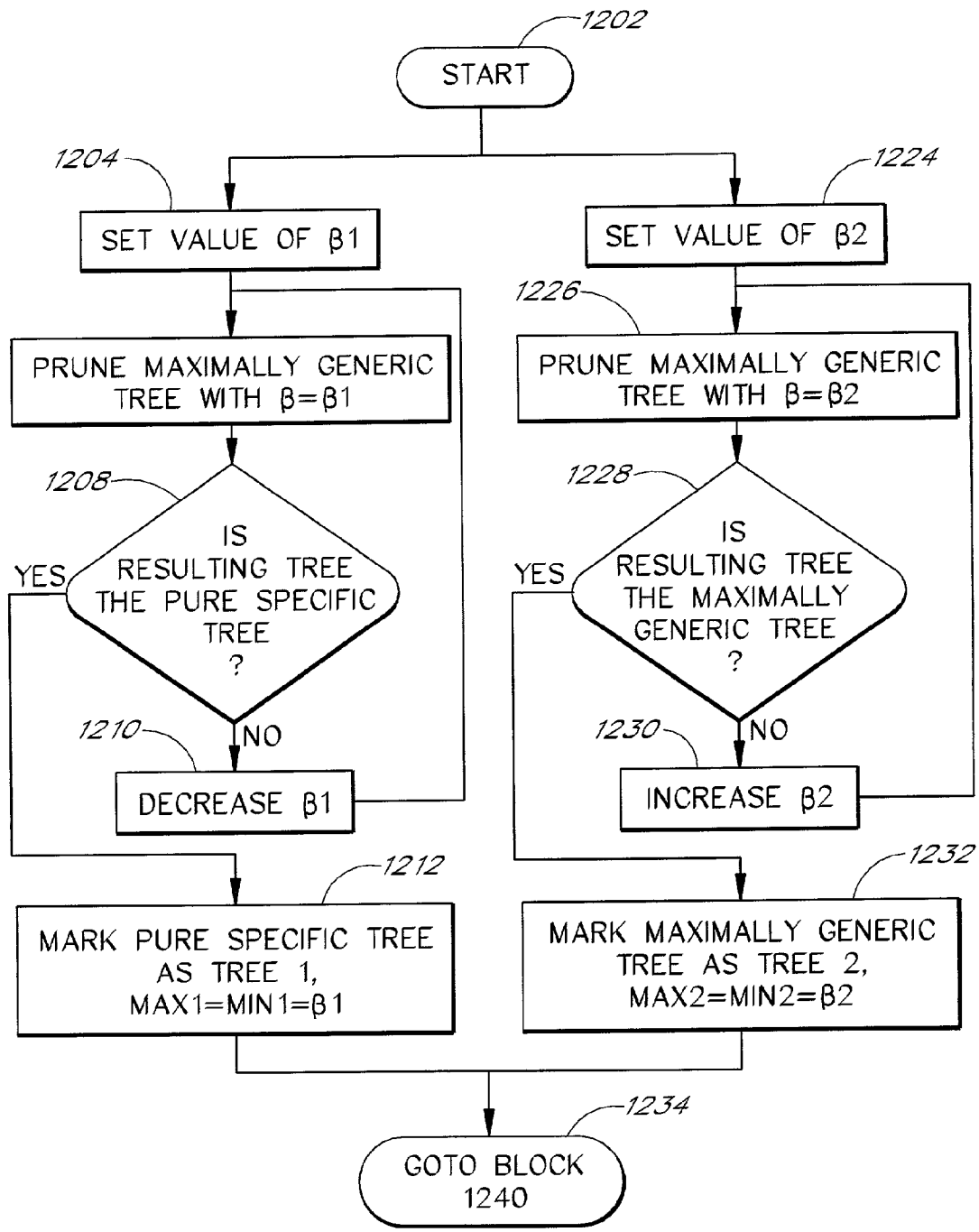
FIG. 12A illustrates one embodiment of the process of adjusting the value of β to find all distinct sub-trees of the maximally generic tree.
Figure 12B:
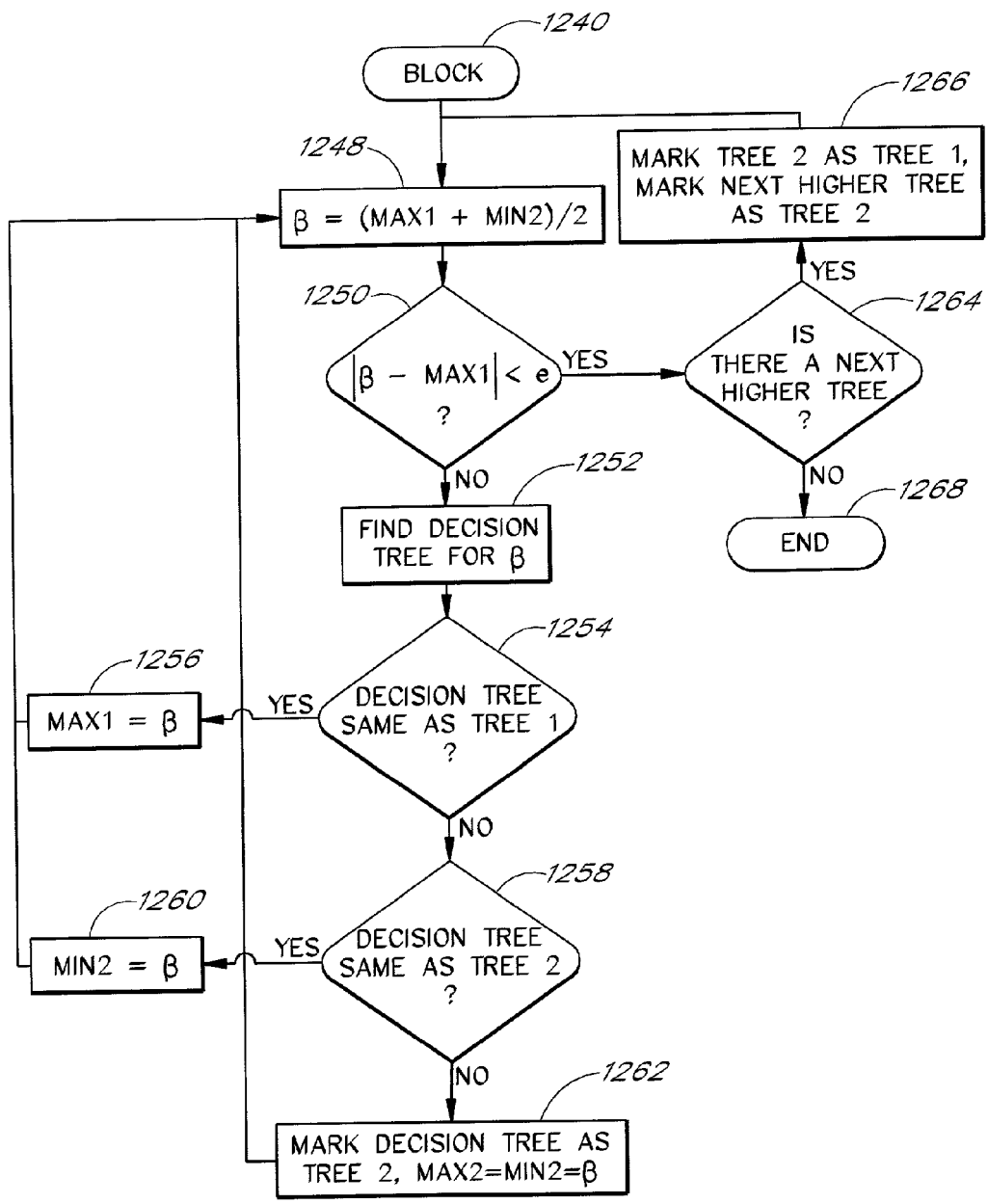
FIG. 12B illustrates one embodiment of the process of adjusting the value of β to find all distinct sub-trees of the maximally generic tree.

FIG. 12A and FIG. 12B illustrate one embodiment of the process of adjusting the value of $\beta$ to find all distinct sub-trees of the maximally generic tree. By repeatedly permuting the maximally generic tree and decreasing an initial value of $\beta 1$ until the permuted tree is the pure-specific tree, the process identifies a minimum value of $\beta$. By repeatedly permuting the maximally generic tree and increasing an initial value of $\beta 2$ until the permuted tree is the maximally generic tree, the process identifies a maximum value of $\beta$. The process then repeatedly permutes the maximally generic tree while adjusting the value of $\beta$ within the range of minimum and maximum values, until every distinct permuted tree is identified.

In FIG. 12A, a start block 1202 proceeds to block 1204. At block 1204, the process sets a parameter $\beta 1$ at an initial value. In one embodiment, $\beta 1$ is set at a negative value. At block 1206, the process permutes the maximally generic tree, using the formula $R_{\alpha\beta}=R_o+\alpha(N_{leaf}-\beta 1 N_{generic})$. At block 1208, the process determines if the resulting pruned tree is the pure-specific tree described in the previous section. If the resulting pruned tree is not the pure-specific tree, then at block 1210 the process decreases the value of $\beta 1$. When the formula $R_{\alpha\beta}=R_o+\alpha(N_{leaf}-\beta 1 N_{generic})$ is used for permuting, a decreased $\beta 1$ may lead to fewer generic nodes (represented by $N_{generic}$), and therefore a less generic tree. In one embodiment in which $\beta 1$ was set at a negative initial value, the process decreases $\beta 1$ by multiplying $\beta 1$ by a positive integer such as 2. If the resulting pruned tree is the pure specific tree, then the process proceeds from block 1208 to block 1212. At block 1212, the process marks the pure specific tree as Tree 1, and sets the values of MAX1(the maximum $\beta$ value of Tree 1) and MIN1 (the minimum $\beta$ value of Tree 1) to the value of $\beta 1$.

Still referring to FIG. 12A, the start block 1202 also proceeds to block 1224. At block 1224, the process sets a parameter $\beta 2$ at an initial value. In one embodiment, $\beta 1$ is set at a positive value. At block 1226, the process permutes the maximally generic tree, using the formula $R\alpha\beta=R_o+\alpha(N_{leaf}-\beta 2 N_{generic})$. At block 1228, the process determines if the resulting permuted tree is the maximally generic tree. If the resulting permuted tree is not the maximally generic tree (i.e., at least a portion of the tree has been permuted), then at block 1230 the process increases the value of $\beta 2$. In one embodiment in which $\beta 2$ was set at a positive initial value, the process increases $\beta 2$ by multiplying $\beta 2$ by a positive integer such as 2. When the formula $R_{\alpha\beta}=R_o+\alpha(N_{leaf}-\beta 2 N_{generic})$ is used for permuting, an increased $\beta 2$ may lead to more generic nodes (represented by $N_{generic}$) and therefore a more generic tree. If the resulting permuted tree is the same as the maximally generic tree, then the process proceeds from block 1228 to block 1232. At block 1232, the process marks the maximally generic tree as Tree 2, and sets the values of MAX2 (the maximum $\beta$ value of Tree 2) and MIN2 (the minimum $\beta$ value of Tree 2) to the value of $\beta 2$.

The $\beta 1$ process of blocks 1204, 1206, 1208, 1210 and 1212 and the $\beta 2$ process of blocks 1224, 1226, 1228, 1230 and 1232 may be performed in parallel or in sequence. After the steps of block 1212 and block 1232 have been performed, the process proceeds to block 1234, which proceeds to block 1240, to be illustrated in FIG. 12B.

FIG. 12B illustrates the process that continues from FIG. 12A. In FIG. 12B, block 1240 proceeds to block 1248. At block 1248, $\beta$ is set at a value between the values of MAX1 and MIN2, for example, the average of MAX1 and MIN2. At block 1250, a determination is made as to whether the difference between $\beta$ and MAX1 is less than $\epsilon$, $\epsilon$ being a predetermined small number. If $\beta$ and MAX1 are considered close enough (i.e., their difference is less than $\epsilon$), the process proceeds to block 1264. Otherwise block 1250 proceeds to block 1252.

At block 1252 of FIG. 12B, the value of $\beta$ determined at block 1248 is applied to the formula $R_{\alpha\beta}=R_o+\alpha(N_{leaf}-\beta N_{generic})$ to permute the maximally generic tree to produce a decision tree. The pruning process is described in the previous section titled "Permuting the Maximally Generic Tree." At block 1254 a determination is made as to whether the resulting decision tree is the same as Tree 1. If the decision tree is the same as Tree 1, then block 1254 proceeds to block 1256 and sets the value of MAX1 to the value of $\beta$, and then returns to block 1248. Otherwise block 1254 proceeds to block 1258 and determines if the decision tree is the same as Tree 2. If the decision tree is the same as Tree 2, then block 1258 proceeds to block 1260 and set the value of MIN2 to the value of $\beta$, and then returns to block 1248. Otherwise block 1258 proceeds to block 1262.

At block 1262, a new decision tree that is different from Tree 1 or Tree 2 is found. The new decision tree is marked as Tree 2 and the values of MAX2 and MIN2 are set to the value of $\beta$. Block 1262 then returns to block 1248.

At block 1264, a determination is made as to whether there is a next higher tree. A next higher tree is a distinct tree associated with a $\beta$ value that is bigger than the current $\beta$ value determined at block 1248. If there is, then block 1264 proceeds to block 1266. At block 1266, Tree 2 is marked as Tree 1, and the next higher tree is marked as Tree 2. The $\beta$ value associated with the newly marked Tree 1 is assigned to MAX1 and MINI. The $\beta$ value associated with the newly marked Tree 2 is assigned to MAX2 and MIN2. Block 1266 then returns to block 1248. If there is no next higher tree, then block 1264 proceeds to an end state block 1268.

Displaying Distinct Optimal Sub-trees to the User

Figure 13:
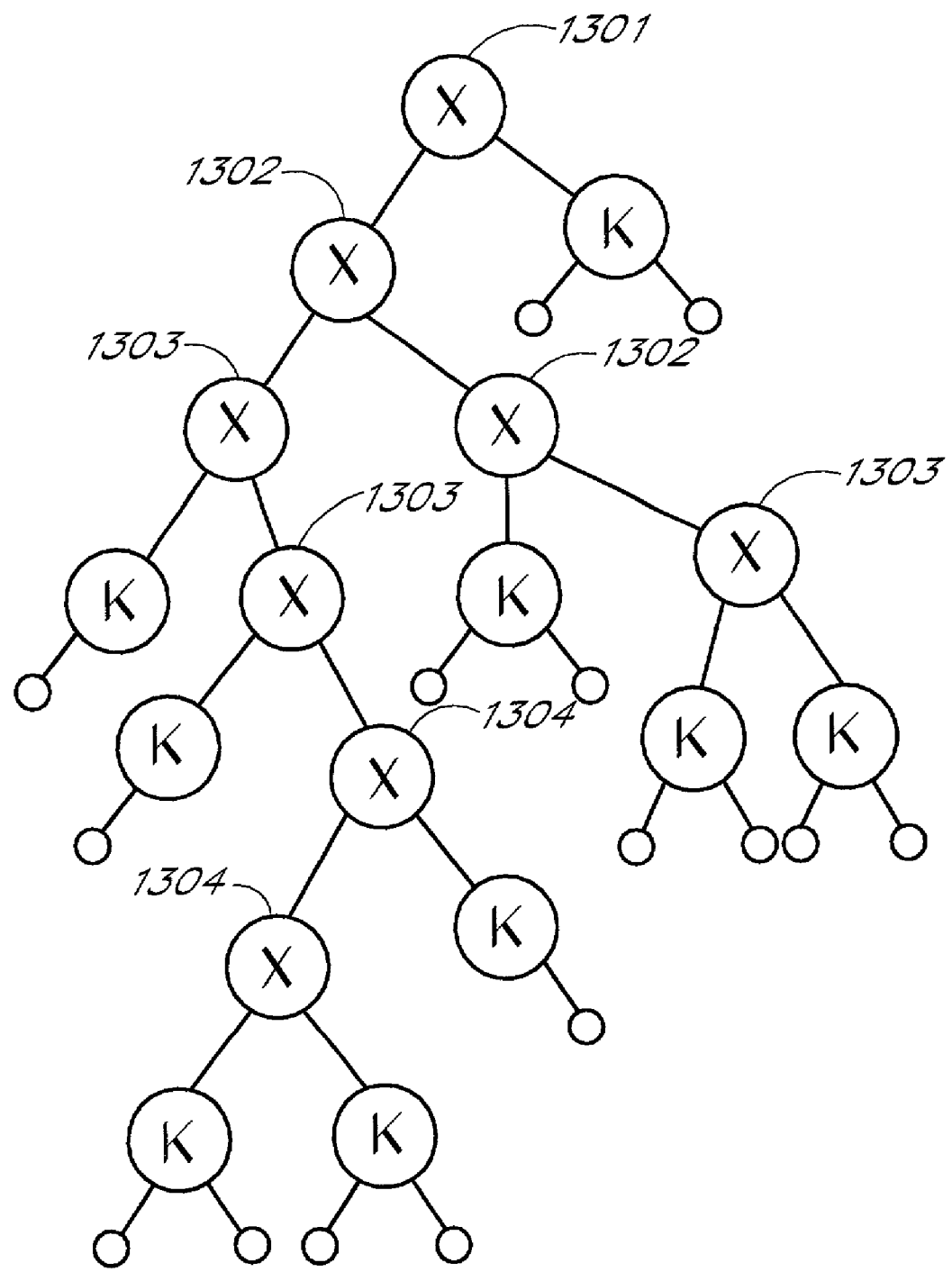
FIG. 13 illustrates an embodiment of displaying distinct optimal sub-trees to the user as labeled sequence trees of the maximally generic tree.

FIG. 13 illustrates an embodiment of displaying distinct optimal sub-trees to the user as labeled sequence trees of the maximally generic tree. The maximally generic tree of FIG. 13 (with alternate K-branches omitted for clarity of display) includes four distinct decision trees found using the process described in the preceding section titled "Finding All Distinct Optimal Trees." They are labeled as sequence trees 1301, 1302, 1303, and 1304 on the maximally generic tree. The generic portion of very sequence tree constitutes a sub-tree of the maximally generic tree. Generic nodes are labeled according to which sequence tree it first encounters. In one embodiment, the minimum $\beta$ value, the maximum $\beta$ value, or the range of $\beta$ values for each sequence tree is also displayed to the user.

A user may select a labeled node to reconstruct that sequence tree. In one embodiment in which the maximally generic tree and the sequence trees are displayed to the user on a computer screen, the user may move an input device such as a mouse, a laser pointer or a touch pen over a particular label. By an input action such as clicking on the label or choosing a menu option, the user may then order the sequence tree represented by that label to be re-constructed. The sequence tree is then displayed as a decision tree on a computer screen, to the exclusion of the maximally generic tree. The user is thus able to visually inspect the distinct optimal trees and choose a decision tree with the desired balance of generic-ness and specific-ness. The user may also save multiple distinct optimal trees for further evaluation. The user may also use multiple distinct optimal trees as different prediction models for predicting the properties of new items.

Using the Decision Tree to Predict Unknown Properties

Unknown properties of new items may now be predicted by evaluating the item against the tree. By starting at the root node, evaluating the item against logic tests at nodes and forming a path until a terminal node is reached, the value associated with the reached terminal node is predicted as the property value for the item.

Figure 14:
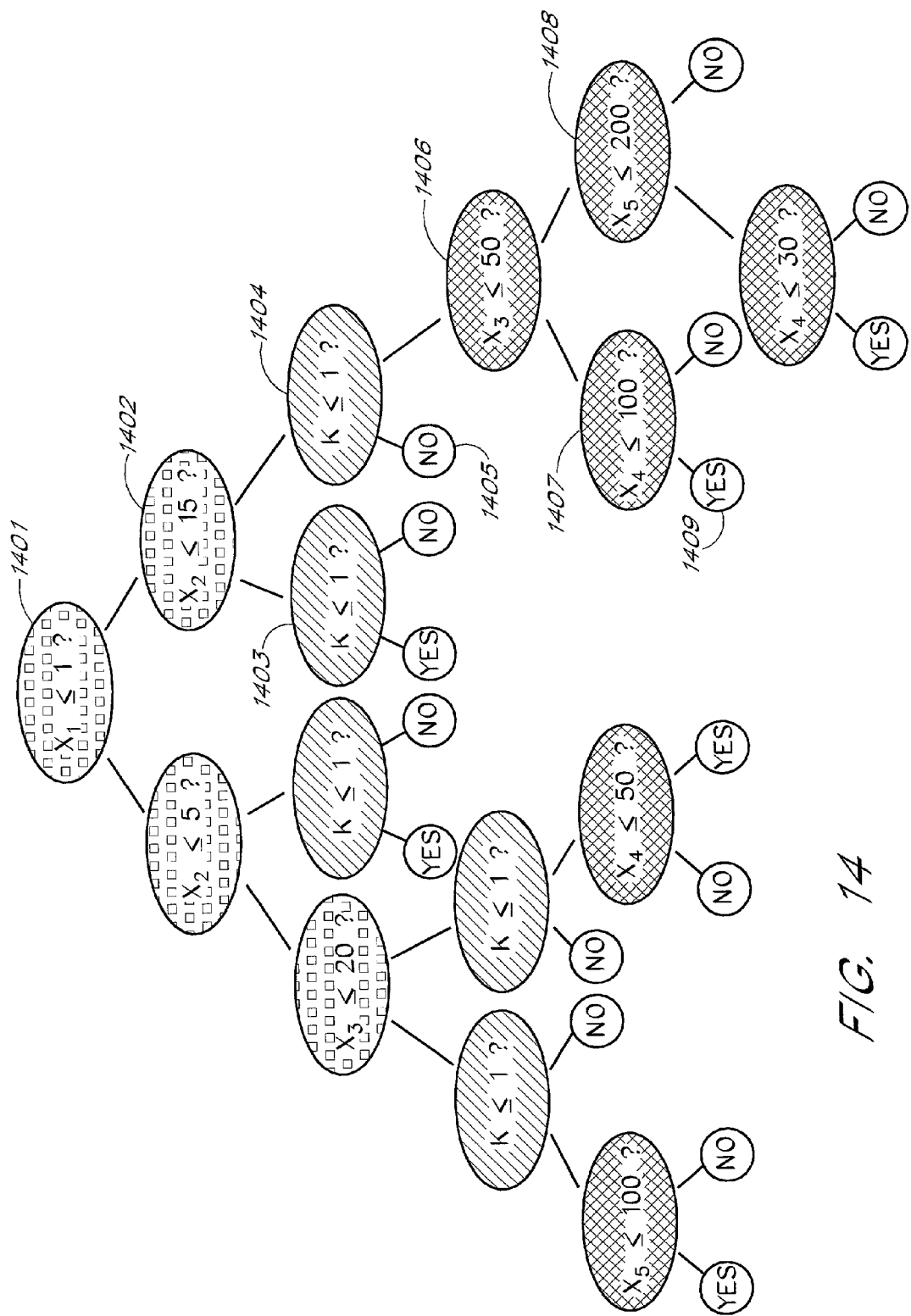
FIG. 14 illustrates one example of a process of predicting multiple unknown properties of a new item using a multi-property decision tree.

FIG. 14 illustrates one example of a process of predicting multiple unknown properties of a new item using a multi-property decision tree. The new item has descriptor values of X1=3, X2=150, X3=5, X4=20 and X5=100, it has two unknown properties Y1 and Y2 each with a possible value of "Yes" or "No". Starting at the root node, the X1 value of the new item is evaluated against the logic test "X1≦1?." Since X1=3>1, the new item's path proceeds from node 1401 to its right descendent node 1402. At node 1402, since X2=150>15, the path proceeds to node 1404. Since node 1404 is a K node, the path is split into multiple sub-paths depending on the number of property types (in this case two). Each sub-path is continued down the tree until a terminal node is reached. The values associated with the terminal nodes are predicted as the property values of the new item. In this example, the two sub-paths are split at K node 1404, one sub-path 1404-1405 reaches terminal node 1405 indicating Y1="Yes", another sub-path 1404-1406-1407-1409 reaches terminal node 1409 indicating Y2="Yes".

In one embodiment, the new item is converted into converted new items each with the same X descriptors, a K descriptor and a single unknown property. Each of the converted new items is evaluated against the decision tree and reaches a terminal node. The value of each reached terminal node represents one of the predicted property values of the new item. For example, the new item described in the preceding section is converted new items Item_A (with K=1), Item_B (with K=2). Item_A and Item_B are evaluated against the logic tests of the decision tree of FIG. 14, and reach terminal nodes 1405 and 1409 respectively. The property values of node 1405 and node 1409 are therefore the new item's predicted values of Y1 and Y2.

Interpretation of Decision Tree

In addition to predicting properties of new data, the decision tree may also aid users in uncovering relationships between properties and in determining what descriptors may represent a generic quality, and what descriptors may represent property-specific activity. In the application of predicting whether molecules bind to compounds, generic qualities might represent drug-like qualities. By studying the decision tree, the user may predict that the X descriptor splits in the generic layer of the decision tree represent generic quality for drug-like activity, and that the X descriptor splits in the specific layer represent property-specific activity. For example, by studying a sample multi-property decision tree illustrated in FIG. 14, a user may predict that descriptors X1 and X2 are associated with generic quality for drug-like activity, and that descriptors X4 and X5 determine target selectivity. Target selectivity refers to a molecule's binding to some compounds but not binding to other compounds. It is typically desirable to have a molecule that binds to some compounds in order to have disease-curing effect, but not bind to other compounds in order to avoid side effects. The user may conduct other studies and experiments to confirm or disprove the predictions. The user may also study the locations of the different X descriptors in the decision tree to gain insights into the relationships of the descriptors.

The decision tree can be helpful to the user even if the tree is created using training items with missing property values. For example, if there are many items with known property values on property Y1 (e.g., whether the item binds to a well-studied compound) but few items with known property values on property Y2 (e.g, whether the item binds to a relatively newly studied compound), a training item set including some items of missing Y2 values may still be used to create a decision tree. By studying the difference between generic layer splits (splits on Y1 and Y2) and specific layer splits (splits on Y1 or Y2), users may gain insights into what is new (or not new) about the new compound Y2.

Classification System

Figure 15:
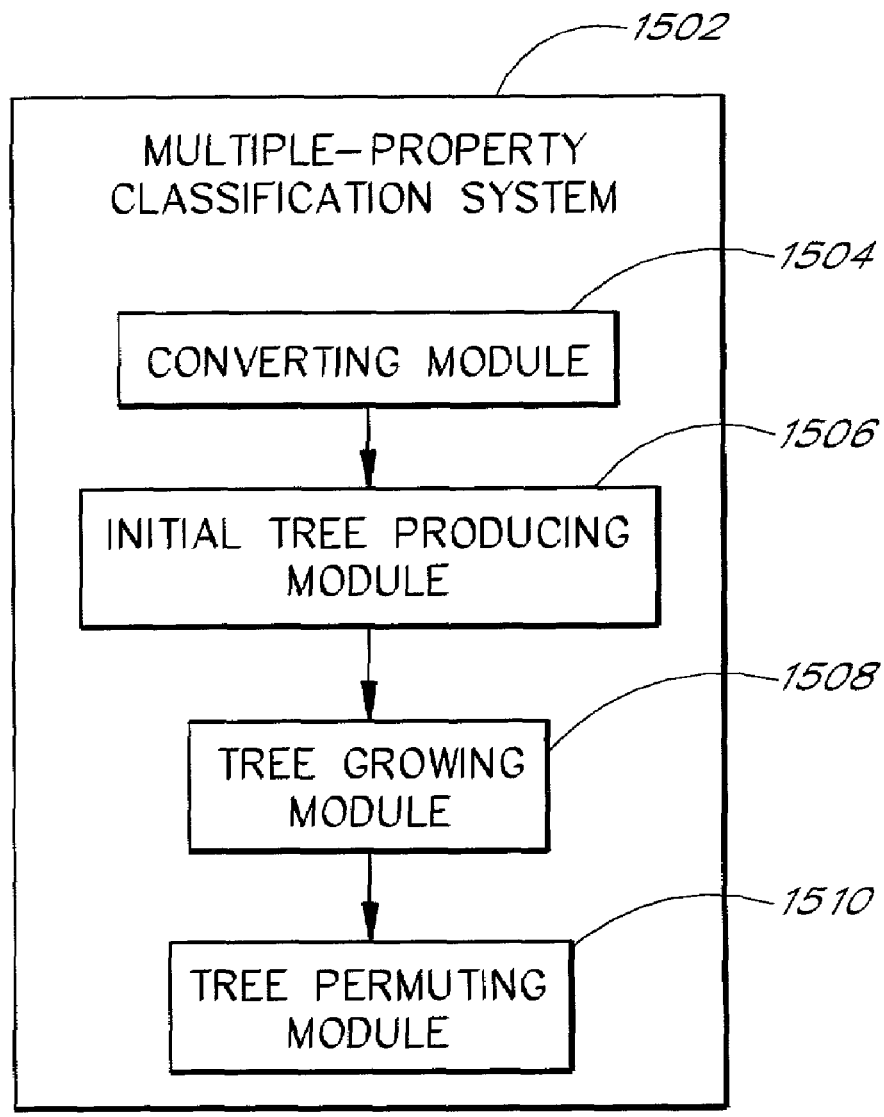
FIG. 15 is a high-level block diagram illustrating one embodiment of a classification system.

FIG. 15 is a high-level block diagram illustrating one embodiment of a multiple-property classification system 1502. Converting module 1504 converts multiple-property training items into converted items of single property and an additional K descriptor, using the process described in the previous section titled "Converting to Single-Property Items." The converted items are used by the initial tree producing module 1506 to produce a pure-specific tree that splits the converted items by a logic test on the K descriptor at the root node. Using the produced pure-specific tree as an alternate K-branch, the tree growing module 1508 grows a maximally generic tree using the process described in the previous section titled "Growing a Maximally Generic Tree." The maximally generic tree grown by the tree growing module 1508 is permuted by the tree permuting module 1510 to produce a final decision tree, using the process described in the previous section titled "Permuting the Maximally Generic Tree." The produced final decision tree classifies the converted items by the logic tests at the nodes.

Prediction System

Figure 16:
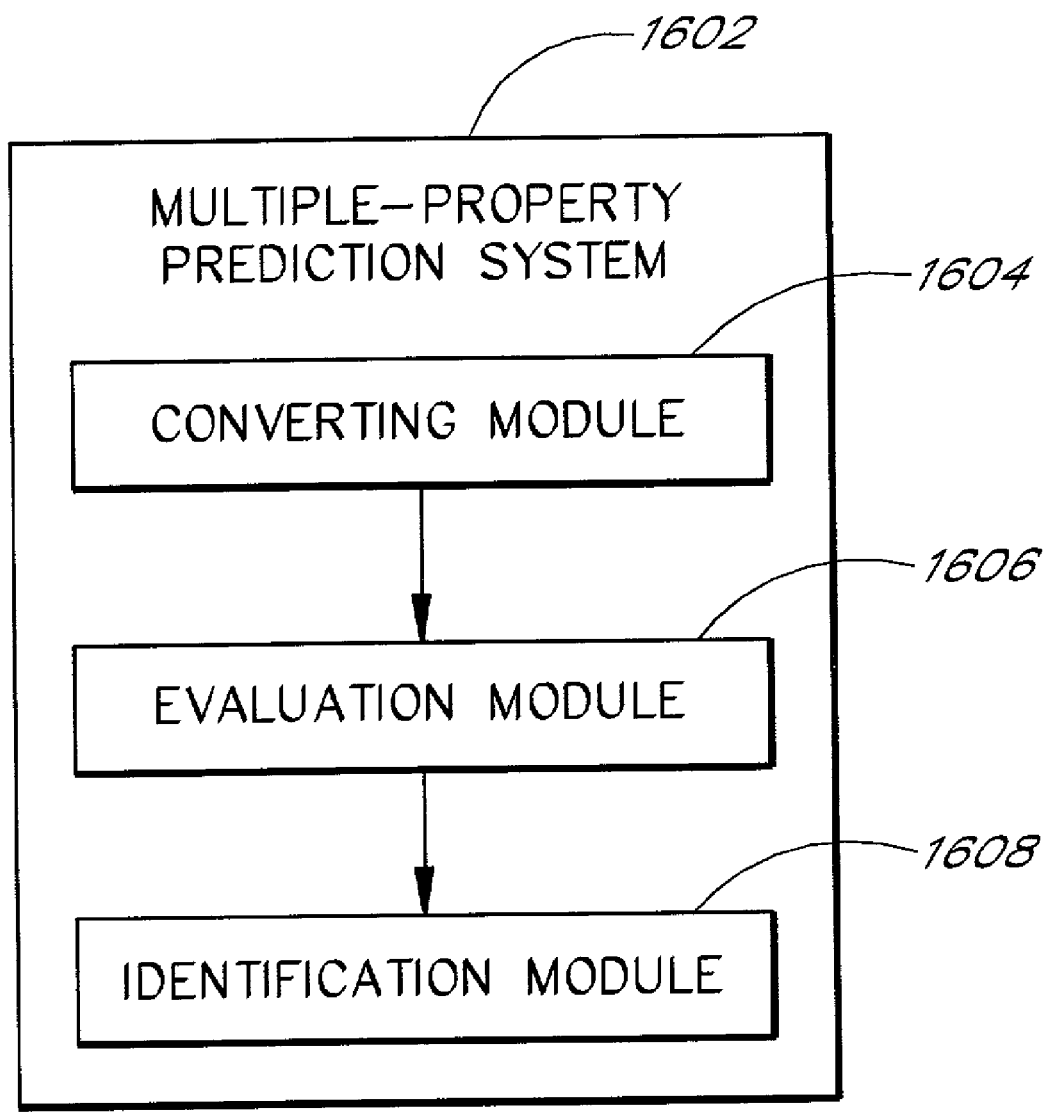
FIG. 16 is a high-level block diagram illustrating one embodiment of a prediction system.

FIG. 16 is a high-level block diagram illustrating one embodiment of a multiple-property prediction system. Given a multiple-property decision tree that has a top layer of generic nodes, a middle layer of K nodes and a bottom layer of specific nodes, and given a new item with X descriptors and multiple unknown properties, an evaluation module 1606 evaluates the X descriptors of the new item against the logic tests of the decision tree and forms multiple sub-paths each reaching a respective terminal node, using the process described in the previous section titled "Using the Decision Tree to Predict Unknown Properties." The identification module 1608 identifies the values of the respective terminal nodes as predicted values of the multiple properties of the new item.

In one embodiment, an optional converting module 1604 converts the new item into converted new items each with the X descriptors, an additional K descriptor and a single property. Each of the converted new items has a different K value and a different property. For each of the converted new items, the evaluation module 1606 evaluates it against the decision tree and forms to a path to a terminal node. The identification module 1608 identifies the values of the terminal nodes as predicted values of the multiple properties of the new item.

CONCLUSION

This application incorporates by reference the above-mentioned book Classification and Regression Trees by Breiman, Friedman, Olshen and Stone in its entirety. The invention is not limited to the study of molecule properties or field of drug research, but applies to others fields that use decision trees to classify and to predict multiple properties.

For example, in the field of market research, it is often desirable to predict likely consumer reaction to multiple products or services, i.e., to find out whether users will purchase the multiple products or services. The prediction can be made based on known consumer descriptors, such as consumer's age, gender, income level, credit history, prior buying history, web browsing activity, and so forth. Using the process disclosed by the present application, a decision tree is formed to classify multiple properties (i.e., whether the consumer has bought or not bought the multiple products or services) of training items (i.e., consumers with known properties) based on their consumer descriptors. The decision tree is then used to predict a consumer's likely reaction to multiple products or services. In the field of assessing credit risks, it is often desirable to predict the likelihood of default on multiple loans. For example, when a consumer applies for a home loan and an educational loan, it may be desirable to predict the likelihood of default on both loans. Using the process disclosed by the present invention, a decision tree is formed to classify multiple properties (i.e., whether the consumer has defaulted on the multiple loans) of consumers based on their descriptors, such as credit history. The decision tree is then used to predict a consumer's likelihood of default on the multiple loans.

This invention may be embodied in other specific forms without departing from the essential characteristics as described herein. The embodiments described above are to be considered in all respects as illustrative only and not restrictive in any manner. For example, although the example trees illustrated in the drawings are binary trees, the invention may be applied to no-binary decision trees, i.e., trees with more than two branches below a node. The scope of the invention is indicated by the following claims rather than by the foregoing description.

As used in the Application including the Claims, the word "module" refers not only to logic coded as a collection of software instructions, but also refers to logic embodied in hardware or firmware.

The foregoing description details certain embodiments of the invention. It will be appreciated, however, that no matter how detailed the foregoing appears in text, the invention can be practiced in many ways. As is also stated above, it should be noted that the use of particular terminology when describing certain features or aspects of the invention should not be taken to imply that the terminology is being re-defined herein to be restricted to including any specific characteristics of the features or aspects of the invention with which that terminology is associated. The scope of the invention should therefore be construed in accordance with the appended claims and any equivalents thereof.

What is claimed is:

1. A computerized method of forming a decision tree to simultaneously classify multiple properties of a training item set, said training item set containing training items each having a plurality of X descriptors and a plurality of original properties, each of said plurality of X descriptors and said plurality of original properties corresponds to a physical aspect of a training item, said method comprising:

defining X descriptor and property data for a plurality of training items, wherein at least some of said training items have a known value for a first property, and at least some of said items have a known value for a second property, wherein said second property is different from said first property;

converting each of said training items into one or more converted training items, said converted training items each having said plurality of X descriptors, a K descriptor and a property, wherein said converting comprises converting a training item having a first original property of value Y1 and a second original property of value Y2 into a first converted training item and a second converted training item, said first converted training item having a K descriptor of value one and a property of value Y1, said second converted training item having a K descriptor of value two and a property of value Y2;

splitting said converted training items at a root node of an original tree by a logic test on said K descriptor;

growing said original tree by repeatedly splitting said converted training items at sub-root nodes of said original tree by logic tests on X descriptors;

pruning said original tree to produce a pure-specific tree;

growing a maximally generic tree, said maximally generic tree having a root node that splits said converted training items by a logic test on a X descriptor; and permuting said maximally generic tree to produce said decision tree, said decision tree operative to classify multiple unknown properties of a physical item.

2. The method of claim 1, wherein said converting comprises converting a training item having a first original property of value Y1 and a second original property of unknown value into a converted training item, said converted training item having a K descriptor of value one and a property of value Y1.

3. The method of claim 1, wherein said pruning said original tree comprises pruning said original tree using minimal cost-complexity pruning.

4. The method of claim 5, wherein said using minimal cost-complexity pruning comprises:
using a formula $R_\alpha = R_o + \alpha N_{leaf}$, wherein $R_\alpha$ is a cost-complexity measure to be minimized, $R_o$ is a miscalculation cost on said converted training items, $N_{leaf}$ is a number of leaf nodes, and $\alpha$ is a parameter; and
enabling a user to specify a value of $\alpha$.

5. The method of claim 3, wherein said using minimal cost-complexity pruning comprises:
using a formula $R_\alpha = R_o + \alpha N_{leaf}$, wherein $R_\alpha$ is a cost-complexity measure to be minimized, $R_o$ is a miscalculation cost on said converted training items, $N_{leaf}$ is a number of leaf nodes of said pure-specific tree, and $\alpha$ is a parameter; and
identifying a value of $\alpha$ by a cross-validation method.

6. The method of claim 5, wherein said permuting said maximally generic tree comprises:
using a formula $R_{\alpha'\beta} = R_o + \alpha' (N_{leaf} - \beta N_{generic})$, wherein $R_{\alpha'\beta}$ is a cost-complexity measure to be minimized, $R_o$ is a miscalculation cost on said converted training items, $N_{leaf}$ is a number of leaf nodes of said decision tree, $\alpha'$ is a parameter, $N_{generic}$ is a number of generic nodes of said decision tree, and $\beta$ is another parameter;
identifying a value of $\alpha'$ based on the identified value of $\alpha$ found by the cross-validation method; and
enabling a user to specify a value of $\beta$.

7. The method of claim 6, wherein identifying a value of $\alpha'$ comprises identifying a value of $\alpha'$ as the identified value of $\alpha$ found by the cross-validation method.

8. The method of claim 6, wherein identifying a value of $\alpha'$ comprises identifying a value of $\alpha'$ as the identified value of $\alpha'$ found by the cross-validation method subtracted by a positive number.

9. The method of claim 6, wherein identifying a value of $\alpha'$ comprises prompting the user to specify a value of $\alpha'$ that is identical to or smaller than the identified value of $\alpha$ found by the cross-validation.

10. The method of claim 1, wherein said growing a maximally generic tree comprises:
marking said pure-specific tree as a generic tree;
marking a root node of said generic tree as a non-final K-node;
for each non-final K-node of said generic tree;
saving a sub-tree beginning with said non-final K-node as an alternate K-branch of said generic tree;
evaluating whether to split said non-final K-node by a X descriptor;
if said evaluation result is negative;
restoring said alternate K-branch to said generic tree; and
marking said non-final K-node as a final K-node; and
if said evaluation result is positive:
splitting said non-final K-node by a X descriptor;
splitting immediate descendent nodes of said node by said K-descriptor;
splitting and optionally pruning non-immediate descendent nodes of said non-final K-node; and
marking each of said immediate descendent nodes as a non-final
K-node if said node may be further split; and
identifying said generic tree as said maximally generic tree.

11. The method of claim 10, wherein said splitting said non-final K-node by a X descriptor comprises splitting said node by a X descriptor logic test that would reduce impurity for all of said plurality of original properties.

12. The method of claim 10, wherein said splitting said non-final K-node by a X descriptor comprises:
for each X descriptor logic test, evaluating a drop in impurity for each of said plurality of original properties, had said non-final K-node been split by said descriptor;
assigning each X descriptor logic test a score that equals the least drop in impurity for one of said plurality of original properties; and
splitting said non-final K-node by a X descriptor logic test having the highest score.

13. The method of claim 10, wherein said splitting and optionally pruning non-immediate descendent nodes of said non-final K-node comprises:
using a formula $R_\alpha = R_o + \alpha N_{leaf}$, wherein $R\alpha$ is a cost-complexity measure to be minimized, $R_o$ is a miscalculation cost on said converted training items, $N_{leaf}$ is a number of leaf nodes of a sub-tree starting at said non-final K-node, and $\alpha$ is a parameter; and
determining a value of $\alpha$ using a cross-validation method; and
wherein said permuting said maximally generic tree comprises:
using a formula $R_{\alpha\beta} = R_o + \alpha (N_{leaf} - \beta N_{generic})$, wherein $R_{\alpha\beta}$ is a cost-complexity measure to be minimized, $R_o$ is a miscalculation cost on said converted training items, $N_{leaf}$ is a number of leaf nodes of said decision tree, $\alpha$ is a parameter determined by said cross-validation method, $N_{generic}$ is a number of generic nodes of said decision tree, and $\beta$ is another parameter; and
enabling a user to specify a value of $\beta$.

14. The method of claim 1, wherein said permuting said maximally generic tree comprises:
using a formula $R_{\alpha\beta} = R_o + \alpha (N_{leaf} - \beta N_{generic})$, wherein $R_{\alpha\beta}$ is a cost-complexity measure to be minimized, $R_o$ is a miscalculation cost on said converted training items, $N_{leaf}$ is a number of leaf nodes of said decision tree, $\alpha$ is a parameter, $N_{generic}$ is a number of generic nodes of said decision tree, and $\beta$ is another parameter;
enabling a user to specify a value of $\alpha$; and
enabling a user to specify a value of $\beta$.

15. The method of claim 1, wherein said permuting said maximally generic tree comprises:
using a formula $R_{\alpha\beta} = R_o + \alpha (N_{leaf} - \beta N_{generic})$, wherein $R_{\alpha\beta}$ is a cost-complexity measure to be minimized, $R_o$ is a miscalculation cost on said converted training items, $N_{leaf}$ is a number of leaf nodes of said decision tree, $\alpha$ is a parameter, $N_{generic}$ is a number of generic nodes of said decision tree, and $\beta$ is another parameter;
identifying a value of $\alpha$ by a cross-validation method; and
enabling a user to specify a value of $\beta$.

16. The method of claim 1, further comprising:
providing a formula $R_{\alpha\beta} = R_o + \alpha (N_{leaf} - \beta N_{generic})$, wherein $R_{\alpha\beta}$ is a cost-complexity measure to be minimized, $R_o$ is a miscalculation cost on said converted training items, $N_{leaf}$ is a number of leaf nodes of said decision tree, $\alpha$ is a parameter, $N_{generic}$ is a number of generic nodes of said decision tree, and $\beta$ is another parameter;

repeatedly decreasing a value of β1 until permuting said maximally generic tree using the formula $R_{\alpha\beta}=R_o+\alpha (N_{leaf}-\beta1\ N_{generic})$ produces said pure-specific tree;

repeatedly increasing a value of β2 until permuting said maximally generic tree using the formula $R\alpha\beta=R_o+\alpha (N_{leaf}-\beta2\ N_{generic})$ produces said maximally generic tree; and for a plurality of values of β that are greater than said value of β1 and smaller than said value of β2, permuting said maximally generic tree using the formula $R_{\alpha\beta}=R_o+\alpha (N_{leaf}-\beta\ N_{generic})$ to produce said decision trees.

17. A computerized method of forming a decision tree to simultaneously classify multiple properties of a training item set, said training item set containing training items each having a plurality of X descriptors and a plurality of original properties, each of said plurality of X descriptors and said plurality of original properties corresponds to a physical aspect of a training item, said method comprising:

defining X descriptor and property data for a plurality of training items, wherein at least some of said training items have a known value for a first property, and at least some of said items have a known value for a second property, wherein said second property is different from said first property;

converting each of said training items into one or more converted training items, said converted training items each having said plurality of X descriptors, a K descriptor and a property;

producing a pure-specific tree using a Bonferoni-modified t-test statistic splitting method, said pure-specific tree having a root node that splits said converted training items by a logic test on said K descriptor;

growing a maximally generic tree, said maximally generic tree having a root node that splits said converted training items by a logic test on a X descriptor; and permuting said maximally generic tree to produce said decision tree, said decision tree operative to classify multiple unknown properties of a physical item.

18. A computerized method of using a decision tree to simultaneously predict multiple unknown properties of a physical item, said physical item having a plurality of X descriptors, said decision tree having a top layer of generic nodes that each splits by a logic test on one of said plurality of X descriptors, a middle layer of K nodes that each splits by a logic test on K, K representing property types of said multiple properties of said physical item, and a bottom layer of specific nodes that each splits by a logic test on one of said plurality of X descriptors, said method comprising:

starting from a root node of said decision tree, evaluating said physical item against logic tests of said top layer of generic nodes and following a tree path resulted from said evaluating;

evaluating said physical item against logic tests of said middle layer of K nodes, wherein a split produced by one of said middle layer of K nodes will differ depending on which of the multiple unknown properties is being predicted after the split such that multiple sub-paths resulting from said evaluating will be followed, each sub-path determined by which of the multiple properties is predicted at the end of said sub-path, each of said multiple sub-paths corresponding to each of said multiple unknown properties of said physical item;

from each of said sub-paths, continue evaluating said physical item until each of said continued sub-paths reaches a respective terminal node; and for each of said unknown properties of said physical item, identify a value associated with each of said respective terminal nodes as a predicted value of said unknown property.

19. A computerized method of using a decision tree to predict multiple unknown properties of a physical item, said physical item having a plurality of X descriptors, said decision tree having a top layer of generic nodes that each splits by a logic test on one of said plurality of X descriptors, a middle layer of K nodes that each splits by a logic test on K, K representing property types of said multiple properties of said physical item, and a bottom layer of specific nodes that each splits by a logic test on one of said plurality of X descriptors, said method comprising:

converting said physical item into one or more converted items, said converted items each having said plurality of X descriptors, a K descriptor having a value dependent on what unknown property of multiple unknown properties is being predicted by each converted item, and an unknown property, said unknown property being one of said multiple unknown properties, said converted items each having a different K descriptor value corresponding to a different unknown property;

for each of said converted items, evaluating said converted item against said decision tree until a respective terminal node is reached; and for each of said unknown properties of said physical item, identify a value associated with each of said respective terminal nodes as a predicted value of said unknown property.

20. A computer system configured for forming a decision tree to simultaneously classify multiple properties of a training item set, said training item set containing training items each having a plurality of X descriptors and a plurality of original properties, each of said plurality of X descriptors and said plurality of original properties corresponds to a physical aspect of a training item, said system comprising:

a converting module configured to convert each of said training item into one or more converted training items, said converted training items each having said plurality of X descriptors, a K descriptor having a value dependent on what unknown property of multiple unknown properties is being predicted by each converted item, and a property;

an initial tree producing module configured to produce a pure-specific tree, said pure-specific tree having a root node that splits said converted training items by a logic test on said K descriptor;

a tree growing module configured to grow a maximally generic tree, said maximally generic tree having a root node that splits said converted training items by a logic test on a X descriptor; and a tree permuting module configured to permute said maximally generic tree to produce said decision tree, said decision tree operative to classify multiple unknown properties of a physical item.

21. A computer system configured for using a decision tree to simultaneously predict multiple unknown properties of a physical item, said physical item having a plurality of X descriptors, said decision tree having a top layer of generic nodes that each splits by a logic test on one of said plurality of X descriptors, a middle layer of K nodes that each splits by a logic test on K, K representing property types of said multiple properties of said physical item, and a bottom layer of specific nodes that each splits by a logic test on one of said plurality of X descriptors, said system comprising:

an evaluation module configured to:
- starting from a root node of said decision tree, evaluating said physical item against logic tests of said top layer of generic nodes and following a tree path resulted from said evaluating;
- evaluating said physical item against logic tests of said middle layer of K nodes, wherein a split produced by one of said middle layer of K nodes will differ depending on which of the multiple unknown properties is being predicted after the split such that multiple sub-paths resulting from said evaluating will be followed, each sub-path determined by which of the multiple properties is predicted at the end of said sub-path, each of said multiple sub-paths corresponding to each of said multiple unknown properties of said physical item;
- from each of said sub-paths, continue evaluating said physical item until each of said continued sub-paths reaches a respective terminal node; and an identification module configured to identify a value associated with each of said respective terminal nodes as a predicted value of said unknown property for each of said unknown properties of said physical item.

* * * * *